(12) United States Patent
Horiguchi et al.

(10) Patent No.: US 8,162,328 B2
(45) Date of Patent: Apr. 24, 2012

(54) VEHICLE

(75) Inventors: Munehisa Horiguchi, Tokyo (JP); Masahiro Hasebe, Tokyo (JP); Nobuaki Miki, Tokyo (JP); Takumi Tachibana, Tokyo (JP); Takashi Naito, Tokyo (JP); Katsunori Doi, Tokyo (JP); Tsukasa Hosokawa, Tokyo (JP)

(73) Assignee: Kabushikikaisha Equos Research (JP)

( * ) Notice: Subject to any disclaimer, the term of this patent is extended or adjusted under 35 U.S.C. 154(b) by 539 days.

(21) Appl. No.: 12/083,984

(22) PCT Filed: Oct. 31, 2006

(86) PCT No.: PCT/JP2006/321793
§ 371 (c)(1),
(2), (4) Date: Apr. 23, 2008

(87) PCT Pub. No.: WO2007/052676
PCT Pub. Date: May 10, 2007

(65) Prior Publication Data
US 2009/0256331 A1    Oct. 15, 2009

(30) Foreign Application Priority Data
Nov. 2, 2005   (JP) .................................. 2005-319591

(51) Int. Cl.
*A61G 5/04* (2006.01)
*B62D 17/00* (2006.01)
(52) U.S. Cl. ............. 280/5.509; 280/124.103; 280/6.15; 280/5.521; 180/218
(58) Field of Classification Search ........... 280/124.103, 280/5.509, 6.15, 304.1, 5.52, 5.521, 6.154; 180/218, 21
See application file for complete search history.

(56) References Cited

U.S. PATENT DOCUMENTS

| | | | | |
|---|---|---|---|---|
| 2,260,102 A * | 10/1941 | Freret | ........................ | 280/5.509 |
| 3,309,097 A * | 3/1967 | Seeber | ........................ | 280/5.508 |
| 3,480,098 A * | 11/1969 | Ward, Jr. | ........................ | 180/41 |
| 4,484,648 A | 11/1984 | Jephcott | | |
| 4,487,429 A * | 12/1984 | Ruggles | .................... | 280/5.521 |
| 4,546,997 A * | 10/1985 | Smyers | .................... | 280/5.509 |
| 5,437,467 A | 8/1995 | Patin | ........................ | 280/112.2 |
| 7,004,271 B1 | 2/2006 | Kamen et al. | ................... | 180/21 |
| 7,370,713 B1 * | 5/2008 | Kamen | ......................... | 180/7.1 |
| 7,377,522 B2 * | 5/2008 | MacIsaac | .................. | 280/5.507 |
| 2004/0051269 A1 * | 3/2004 | Bouton | .................. | 280/124.103 |
| 2005/0206101 A1 * | 9/2005 | Bouton | ..................... | 280/6.154 |
| 2005/0248115 A1 * | 11/2005 | Huhmarkangas et al. | ..................... | 280/124.111 |
| 2008/0197597 A1 * | 8/2008 | Moulene et al. | ........ | 280/124.103 |

(Continued)

FOREIGN PATENT DOCUMENTS
FR         2063370          7/1971
(Continued)

*Primary Examiner* — Paul N Dickson
*Assistant Examiner* — Keith Frisby
(74) *Attorney, Agent, or Firm* — Bacon & Thomas, PLLC

(57) ABSTRACT

By bending and stretching a link mechanism, both left and right wheels of a vehicle can be inclined toward inside of cornering to generate a camber thrust as a lateral force, i.e. an increase in cornering force. Further, by bending and stretching the link mechanism, the passenger compartment can be inclined in accordance with inclination of a connecting link, and thus the center of gravity of the vehicle can be moved toward its inner wheel during cornering. By preventing lifting of the inner wheel during cornering, cornering performance is improved. Because the passenger compartment is inclined toward the inner wheel during cornering, centrifugal force is less likely to be felt by the occupant.

13 Claims, 18 Drawing Sheets

U.S. PATENT DOCUMENTS

2008/0238005 A1 * 10/2008 James ..................... 280/5.509

FOREIGN PATENT DOCUMENTS

| JP | 3081809 U | 8/1991 |
|---|---|---|
| JP | 2001-055034 | 2/2001 |
| JP | 2004-345608 | 12/2004 |
| JP | 2005-075070 | 3/2005 |
| JP | 2005/094898 | 4/2005 |
| JP | 2005-145296 | 6/2005 |
| JP | 2005-162060 | 6/2005 |
| JP | 2006-315666 | 11/2006 |
| WO | 9961304 | 12/1999 |

* cited by examiner

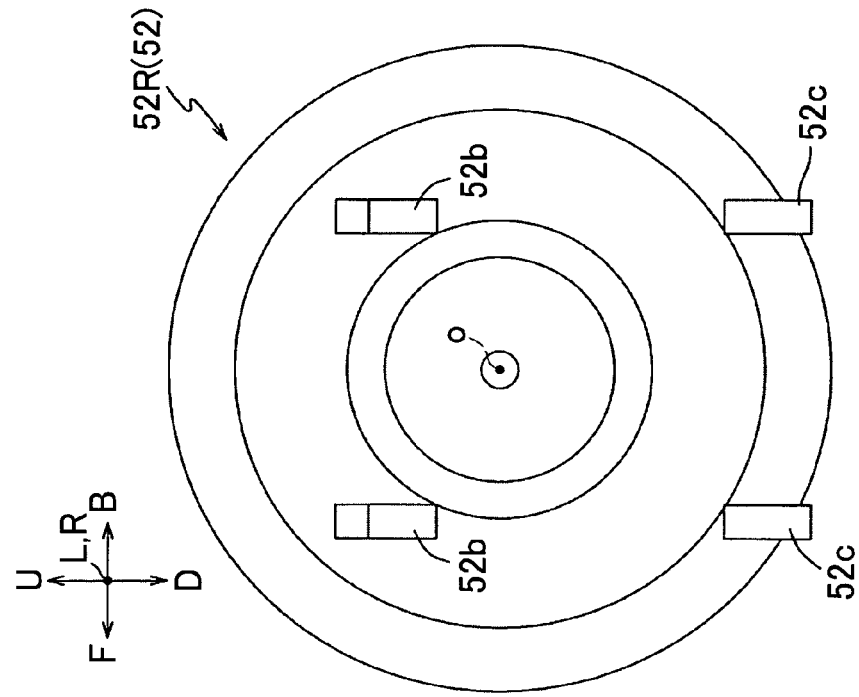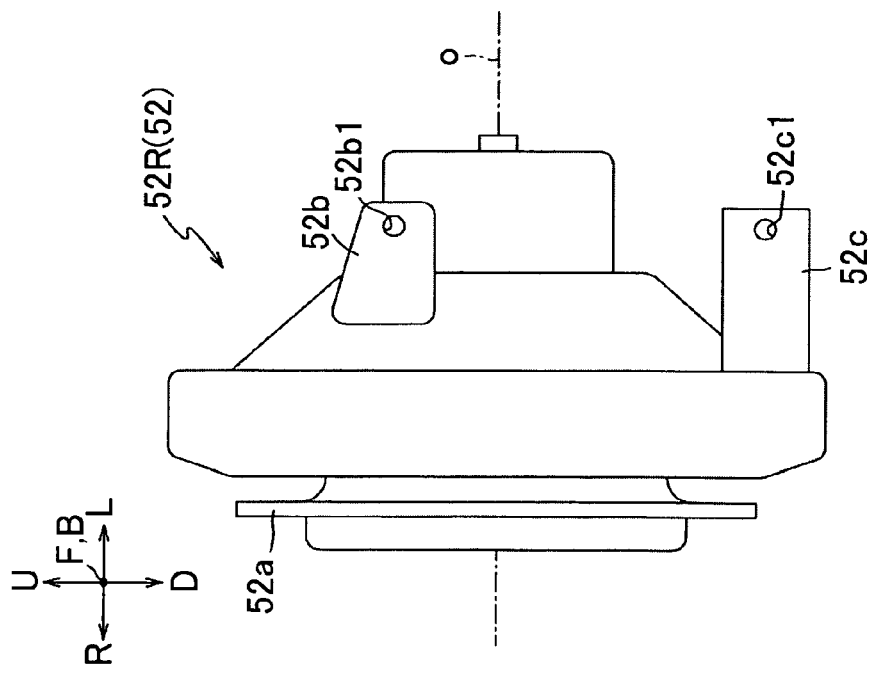

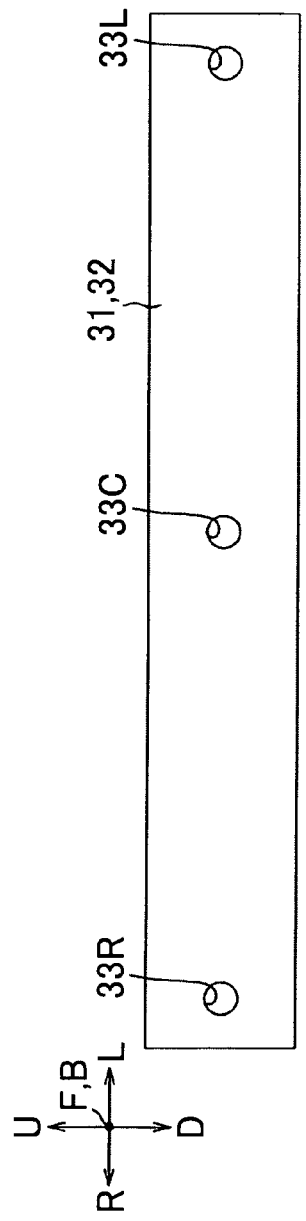
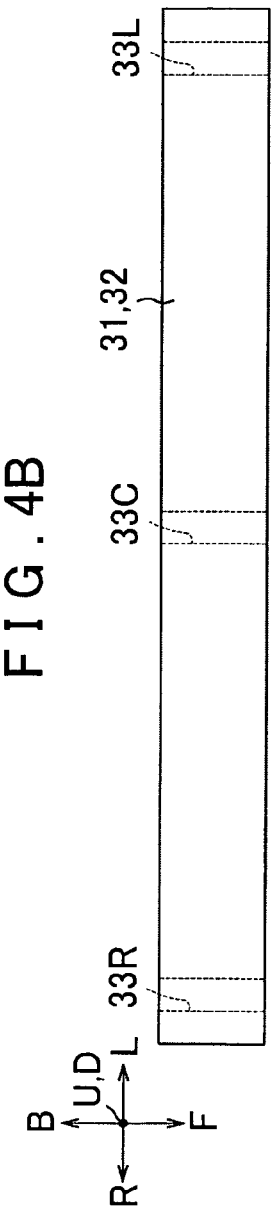
FIG. 4A
FIG. 4B

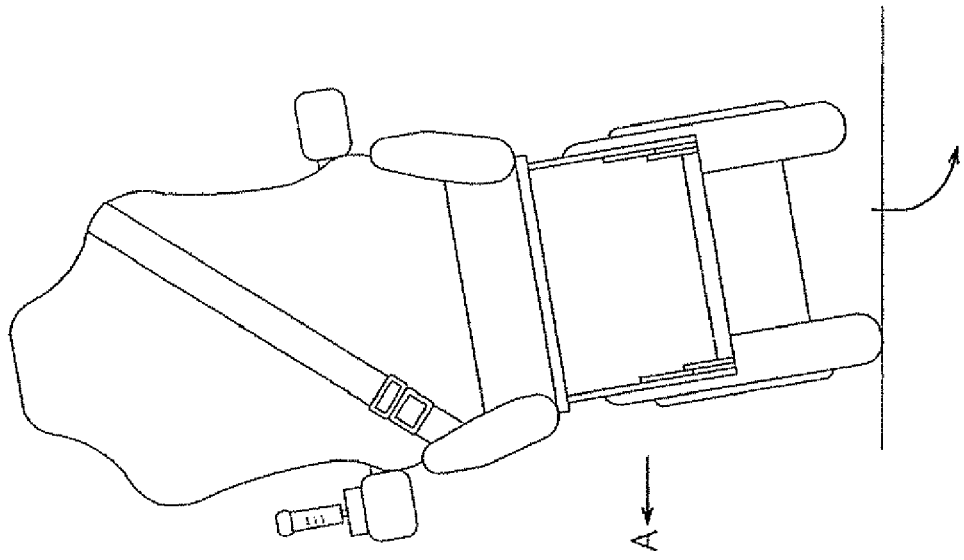
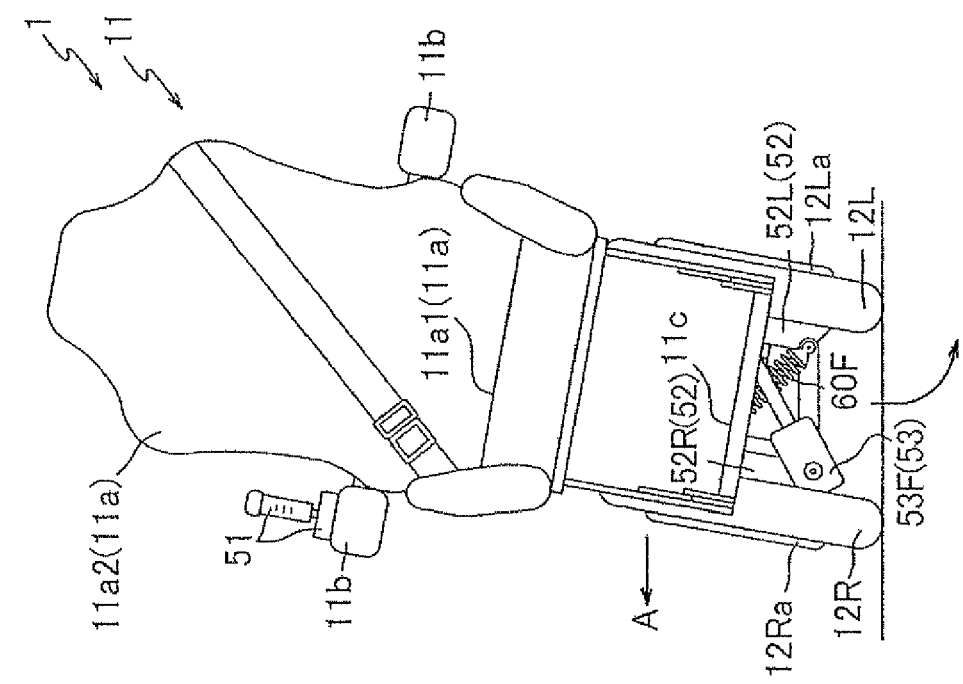

VEHICLE

TECHNICAL FIELD

The present invention relates to a vehicle having a pair of wheels and a link mechanism for supporting the pair of wheels, and more particularly to a vehicle that can improve its cornering performance to perform a stable cornering and also that can reduce burden on an occupant to ensure comfort.

BACKGROUND ART

In recent years, in view of problems of exhaustion of energy resources, saving in vehicle fuel consumption has been strongly demanded. On the other hand, due to reduction in vehicle prices and so on, vehicle owners have increased to such an extent that there is a trend that each person owns one vehicle. As a result, there has been a problem of wasting energy because, for example, a four-seated vehicle is driven, loaded only with the driver.

Consequently, various studies are being made to downsize vehicles for saving fuel consumption. As a method for saving fuel consumption by downsizing a vehicle, it can be said that the vehicle is the most efficient when it is structured as a two-wheeled vehicle for one person.

As a two-wheeled vehicle for one person as described above, for example, a type of vehicle in which the occupant rides in a standing posture is disclosed in Japanese Patent Application Publication Nos. JP-A-2005-75070 and JP-A-2005-94898. On the other hand, a type of vehicle in which the occupant rides in a seated posture is disclosed in Japanese Patent Application Publication No. JP-A-2005-145296 (Patent Documents 1 to 3).

However, there has been a problem in such vehicles (two-wheeled vehicles for one person) that, when a lateral acceleration (centrifugal force, indicated by an arrow A in FIG. 10B) acts on a vehicle body due to cornering, the inner wheel during cornering is prone to lift (refer to FIG. 10B), leading to insufficient stability during cornering, and thus causing lateral overturning of the vehicle during cornering unless it is sufficiently slowed down.

On the other hand, Japanese Patent Application Publication No. JP-A-2001-55034 describes a technology, though for a four-wheeled vehicle, in which, by making a vehicle body support right and left wheels through pivot transfer levers, and also by connecting together the right and left pivot transfer levers with a connecting rod, a link mechanism is formed by the two pivot transfer levers and the connecting rod together with the vehicle body, and then by driving the link mechanism (pivot transfer levers) with an actuator, the right and left wheels are inclined toward inside of cornering, thus aiming at improving a cornering performance (Patent Document 4).

Patent Document 1

Japanese Patent Application Publication No. JP-A-2005-75070

Patent Document 2

Japanese Patent Application Publication No. JP-A-2005-94898

Patent Document 3

Japanese Patent Application Publication No. JP-A-2005-145296

Patent Document 4

Japanese Patent Application Publication No. JP-A-2001-55034 (for example, paragraphs [0011, 0034, and 0035], and FIG. 4)

DISCLOSURE OF THE INVENTION

Problems to be Solved by the Invention

However, because the vehicle attitude during cornering is kept horizontal in the hitherto known vehicle described above (Patent Document 4), the lateral acceleration (centrifugal force) acts as a force to laterally slide the occupant on a seat. As a result, there has been a problem that a burden on the occupant increases, making driving operation during cornering difficult and also causing degradation in comfort.

In addition, because a two-wheeled vehicle is lighter and has a smaller tread width compared with a four-wheeled vehicle, there has been a problem that it is difficult to suppress the lifting of the inner wheel during cornering by simply applying the above-described technology in the hitherto known vehicle directly to the two-wheeled vehicle, and therefore the effect of improvement in cornering performance cannot be sufficiently exerted.

In order to solve the problems described above, it is an object of the present invention to provide a vehicle that can improve its cornering performance to perform stable cornering and also that can reduce burden on the occupant to ensure its comfort.

Means for Solving the Problem

In order to achieve the object of the present invention described above, the vehicle has a pair of wheels and an occupant portion in which an occupant rides, the vehicle includes a link mechanism for connecting the pair of wheels, and a link driving device for bending and stretching the link mechanism by applying a driving force to the link mechanism, and the vehicle, with a driving force of the link driving device, bends and stretches the link mechanism to give camber angles to the pair of wheels and also to incline the occupant portion toward inside of cornering, during cornering.

The link mechanism preferably includes a pair of wheel supporting bodies for respectively supporting each of the pair of wheels rotatably via a shaft, and includes also a first link and a second link that are supported at both ends by the pair of wheel supporting bodies via shafts, and in which the link driving device includes telescopic actuators, and connects at least one end of the actuators to a supporting shaft, to the first link, to the second link, or to the wheel supporting body of the link mechanism.

In another embodiment the link driving device includes telescopic actuators, and connects at least one end or both ends of the actuators to supporting shafts of the link mechanism that are not adjacent to each other.

In yet another embodiment the link driving device includes telescopic actuators, and connects at least one end or both ends of the actuators to the pair of wheel supporting bodies, respectively.

Preferably, the vehicle further includes a connecting link that is supported at one end by the first link and the second link via shafts and that is connected at the other end to the occupant portion. The vehicle inclines the occupant portion toward inside of cornering by inclining the connecting link in accordance with bending and stretching of the link mechanism.

Preferably, a center distance between supporting shafts via which the pair of wheel supporting bodies support the both ends of the first link is a distance of smaller dimension than a center distance between supporting shafts via which the pair of wheel supporting bodies support the both ends of the second link.

In another embodiment the vehicle further includes a pair of motor units, in which the pair of motor units serve both as a rotational drive unit for respectively applying rotational driving forces to the pair of wheels and as the pair of wheel supporting bodies for respectively supporting each of the pair of wheels rotatably.

In yet another embodiment the vehicle has a link driving device which includes a pair of telescopic actuators, in which the pair of actuators either are supported at both ends respectively by supporting shafts of the link mechanism that are not adjacent to each other or are connected at both ends respectively to the pair of wheel supporting bodies, and the pair of actuators are also arranged in directions intersecting with each other, one of the pair of actuators being lengthened while the other actuator being shortened when bending and stretching the link mechanism.

In still another embodiment, the vehicle further includes a return device for returning the link mechanism to a neutral position after it has been bent and stretched in either direction.

Effects of the Invention

According to the present invention by connecting a pair of wheels with a link mechanism and by bending and stretching the link mechanism with a driving force of a link driving device, the pair of wheels can be inclined in the same direction as each other. In other words, during cornering, because the pair of wheels can be inclined together toward inside of cornering to generate a camber thrust by a lateral force, there is an effect that an increase in cornering force can be attempted.

In addition, according to the vehicle of the present invention, during cornering, at the same time as inclining the pair of wheels, an occupant portion can be inclined in the same direction as the direction of such an inclination of the pair of wheels (that is, the pair of wheels inclined toward inside of cornering). Hereby, because the position of center of gravity of the vehicle can be moved toward an inner wheel during cornering (that is, the position of center of gravity of the vehicle can be moved toward above the inner wheel during cornering), there is an effect that more vehicle weight by that much can act on the inner wheel during cornering, thus increasing a vertical load of the inner wheel during cornering.

As a result, because a counteracting force against a centrifugal force can be increased, there are effects that lifting of the inner wheel during cornering can be prevented, and also that the ratio of vertical load between outer and inner wheels during cornering can be equalized to improve cornering performance.

In addition, if the occupant portion can be inclined toward the inner wheel during cornering as described above, such an inclination of the occupant portion can be served to reduce a component of force to laterally slide the occupant on a seat, and also to increase by that much a component of force in the direction of pressing the hip portion of the occupant against the seating face of the seat. In other words, because a lateral acceleration (centrifugal force) can be made act as a force pressing the hip portion of the occupant against the seating face of the seat, there is an effect that the centrifugal force becomes less likely by that much to be felt by the occupant.

Hereby, because burden and discomfort of the occupant due to centrifugal force during cornering can be reduced, and also because the cornering can be performed while keeping the same posture as during straight running, there is an effect that an improvement in comfort and operability for the occupant can be attempted.

In addition, according to the present invention, because the occupant is not required to counteract the centrifugal force by inclining the occupant's own posture (by shifting the occupant's own weight) toward the inner wheel during cornering in order to prevent lifting of the inner wheel during cornering, there are effects that the vehicle can be stably driven without a high-level driving skill, and also that driving operation can be performed while keeping the same posture as during straight running. As a result, a reduction in burden of operation and an improvement in comfort for the occupant can be attempted.

Where the link mechanism is structured so as to include a pair of wheel supporting bodies for respectively supporting each of the pair of wheels rotatably, and also to include a first link and a second link that are supported at both ends by the pair of wheel supporting bodies via shafts, the pair of wheels can be inclined in the same direction as each other by bending and stretching the link mechanism with a driving force of the link driving device. In other words, during cornering, because in accordance with the inclination of the pair of wheel supporting bodies, the pair of wheels can be inclined together toward inside of cornering to generate a camber thrust by a lateral force, there is an effect that an increase in cornering force can be attempted.

In addition, according to the vehicle of the present invention, because the link driving device includes telescopic actuators, and is structured so as to connect at least one end of the actuators to a supporting shaft, to the first link, to the second link, or to a wheel supporting body of the four bar link mechanism (the link mechanism composed of the first and the second links, and the pair of wheel supporting bodies), and so as also to bend and stretch the link mechanism in accordance with the telescopic drive of the actuators, there is an effect that the structure to bend and stretch the link mechanism can be simplified so as to save weight of the whole vehicle and to reduce a product cost, by that much.

In other words, because if the link driving device is structured with a rotary actuator (for example, an electric motor, a hydraulic motor, or an engine), a mechanism for converting its rotational motion to a linear motion is required, there is a problem that the structure to bend and stretch the link mechanism becomes complicated, increasing weight and causing increase in size. On the other hand, a telescopic actuator does not require the above-mentioned conversion mechanism, enabling simplification of the structure, so that weight reduction and size reduction can be attempted.

Where the link mechanism includes a pair of wheel supporting bodies for respectively supporting each of the pair of wheels rotatably, and also includes a first link and a second link that are supported at both ends by the pair of wheel supporting bodies via shafts, the pair of wheels supporting bodies can be inclined in the same direction as each other by bending and stretching the link mechanism with a driving force of the link driving device. In other words, during cornering, because in accordance with the inclination of the pair of wheel supporting bodies, the pair of wheels can be inclined together toward inside of cornering to generate a camber thrust by a lateral force, there is an effect that an increase in cornering force can be attempted.

In addition, according to the vehicle of the present invention, because the link driving device is structured so as to include telescopic actuators, and so as to bend and stretch the link mechanism in accordance with the telescopic drive of the actuators, and because both ends of the actuators are connected to supporting shafts of the four bar link mechanism (the link mechanism composed of the first and the second links, and the pair of wheel supporting bodies) that are not adjacent to each other (that is, the actuators are arranged crosswise to each other on the diagonal lines of the four bar link mechanism), there is an effect that the distances from the points of application of force (supporting shafts to which both ends of the actuators are connected) to the centers of rotation (remaining supporting shafts to which both ends of the actuators are not connected) are maximized, and, by that much, the driving force required for bending and stretching the link mechanism can be reduced.

As a result, because bending and stretching of the link mechanism can be performed smoothly (with high speed and high accuracy), and also because the driving performance required of the actuators can be held low, there is an effect that the actuators and their driving source can be reduced in size so that a weight reduction and a reduction in part cost can be attempted.

Besides, in the case of providing arms additionally to the link mechanism in order to lengthen the above-mentioned distances from the points of application of force to the centers of rotation, the weight increases by the weight of the arms, and also the arms and the actuators protrude outside of the outer shape of the link mechanism when the link mechanism bends and stretches, thus disabling reduction in size.

In contrast, as presented by the present invention, by employing a structure in which both ends of the actuators are arranged crosswise to each other on the diagonal lines of the link mechanism, the above-mentioned distances can be maximized without providing the arms, and also it is avoided that the actuators protrude outside of the outer shape of the link mechanism when the link mechanism bends and stretches, thus enabling a reduction in size.

Where the link mechanism includes a pair of wheel supporting bodies for respectively supporting each of the pair of wheels rotatably, and also to includes a first link and a second link that are supported at both ends by the pair of wheel supporting bodies via shafts, the pair of wheels supporting bodies can be inclined in the same direction as each other by bending and stretching the link mechanism with a driving force of the link driving device. In other words, during cornering, because in accordance with the inclination of the pair of wheel supporting bodies, the pair of wheels can be inclined together toward inside of cornering to generate a camber thrust by a lateral force, there is an effect that an increase in cornering force can be attempted.

In addition, according to the vehicle of the present invention, because the link driving device is structured so as to include telescopic actuators, and so as to bend and stretch the link mechanism in accordance with the telescopic drive of the actuators, and because both ends of the actuators are connected to the wheel supporting bodies, there is an effect that size reduction of the vehicle can be attempted while reducing the driving force required for bending and stretching the link mechanism.

In other words, because a structure in which both ends of the actuators are connected to the wheel supporting bodies can ensure longer distances from the points of application of force (portions to which both ends of the actuators are connected) to the centers of rotation (supporting shafts located on the farther side from both ends of the actuators), the driving force required for bending and stretching the link mechanism can be reduced by that much. As a result, bending and stretching of the link mechanism can be performed smoothly (with high speed and high accuracy), and also the driving performance required for the actuators can be held low; by that much, the actuators and their driving source can be reduced in size so that a weight reduction and a reduction in part cost can be attempted.

In addition, with a structure in which both ends of the actuators are connected to the wheel supporting bodies, because such actuators can be housed in the internal space of the link mechanism, the space required for arranging the actuators can be reduced by effectively utilizing the internal space of the link mechanism which is otherwise a dead space, thus enabling a reduction in size of the whole vehicle by that much. Note that because the internal space of the link mechanism is deformed in accordance with bending and stretching of such a link mechanism, it cannot contain a structural object. As presented by the present invention, containing the structural object has only been made possible to be achieved by structuring the actuators to be telescopic and by adopting a structure in which the actuators undergo a telescopic deformation in accordance with bending and stretching of the link mechanism. Hereby, as described above, a suppression of requirement for driving ability of the actuators and a reduction in the vehicle size can be achieved at the same time.

If an end of a connecting link with the other end connected to the occupant portion is supported by the first link and the second link via shafts, the pair of wheel supporting bodies can be inclined, and at the same time, the connecting link can be inclined in the same direction as the direction of such an inclination of the pair of wheel supporting bodies (that is, the pair of wheels inclined toward inside of cornering), by bending and stretching the link mechanism with a driving force of the link driving device.

Hereby, without necessity for separately driving the pair of wheels and the occupant portion, respectively, with two driving devices, there is an effect that one driving device (link driving device) can drive the pair of wheels and the occupant portion, respectively, at the same time and also in desired directions. As a result, there is an effect that a reduction in part cost, or a weight reduction and a size reduction of the vehicle can be attempted.

Where center distance between supporting shafts via which the pair of wheel supporting bodies support the both ends of the first link is a distance of smaller dimension than a center distance between supporting shafts via which the pair of wheel supporting bodies support the both ends of the second link, there is an effect that, when the link mechanism is bent and stretched by a driving force of the link driving device, the total value of the camber thrust generated on the pair of wheels and the tread width of the pair of wheels can be increased while keeping the same inclination angle of the occupant portion, compared with the case in which the center distances do not differ from each other (that is, the case in which the four bar link mechanism (the link mechanism composed of the first and the second links, and the pair of wheel supporting bodies) is structured as a parallelogram link mechanism). Hereby, an improvement in cornering force and in cornering stability can be attempted.

Where a pair of motor units serve as a rotational drive unit for respectively applying rotational driving forces to the pair of wheels, there is an effect that a differential motion can be produced between the pair of wheels, without providing a complicated structure in which, for example, a differential device is provided and the differential device is connected to the pair of wheels with constant-velocity joints.

At the same time, because the pair of motor units serve both as a rotational drive unit and as the pair of wheel supporting bodies, there is an effect that the number of parts can be reduced so as to simplify the structure. As a result, there is an effect that a weight reduction and a reduction in part and assembly cost can be attempted.

In embodiments, where the link driving device includes a pair of telescopic actuators, there is an effect that a sufficient driving force can be obtained to bend and stretch the link mechanism, and also to hold it. As a result, there are effects that a performance of response to cornering condition is enhanced, and also that a cornering attitude can be surely maintained.

In addition, because, by providing a pair of the actuators, if one of them has failed, the other can bend and stretch the link mechanism with its driving force, there is an effect that an improvement in safety and reliability in the case of failure can be attempted by ensuring a fail-safe function.

Moreover, by providing a pair of the actuators, there is an effect that a weight balance as a whole vehicle can be ensured, compared with in the case of providing only one actuator. As a result, an improvement in straight running stability and in cornering performance can be attempted.

Furthermore, according to the present invention, because the pair of actuators are arranged in directions intersecting with each other, there is an effect, compared with in the case of arranging them in the same direction as each other, that the link mechanism can be evenly bent and stretched in either direction, ensuring a stability of cornering operation.

For example, in a structure in which one actuator is arranged crosswise on a diagonal line of the four bar link mechanism, when the actuator is lengthened so as to bend and stretch the link mechanism from its neutral position to one direction (for example, corresponding to a right turn), the angle formed by the direction of application of force and a link of the link mechanism gradually approaches 0°, in accordance with the lengthening.

In other words, the proportion of a force component for rotating a link of the link mechanism (that is, a force component in a perpendicular direction to a virtual line connecting the center of rotation of one link and the point of application of force) in a force applied from the actuator to the link mechanism is reduced.

On the other hand, when the actuator is shortened so as to bend and stretch the link mechanism from its neutral position to the other direction (corresponding to a left turn), the angle formed by the direction of application of force and a link of the link mechanism gradually approaches 90°, in accordance with the shortening.

In other words, the proportion of a force component for rotating a link of the link mechanism (that is, a force component in a perpendicular direction to a virtual line connecting the center of rotation of one link and the point of application of force) in a force applied from the actuator to the link mechanism is increased.

In the case of bending and stretching the link mechanism as described above, the process for lengthening the actuator requires a larger driving force than the process for shortening it requires (in other words, the process for shortening the actuator can bend and stretch the link mechanism with a smaller driving force than the process for lengthening it can). Note that the same as the above applies to the structure in which one actuator is connected to each of the pair of wheel supporting bodies, respectively.

Therefore, in the case of providing a pair of actuators, because, if the pair of these actuators are arranged in the same direction as each other, the required driving force differ between the process for bending and stretching the link mechanism in one direction (that is, for lengthening the actuator) and the process of bending and stretching it in the other direction (that is, for shortening the actuator), it becomes difficult to make the amount and speed of bending and stretching of the link mechanism accurately coincide in both directions (that is, between right turn and left turn).

As a result, there occurs a problem that bending and stretching of the link mechanism, that is, cornering operation of the vehicle, becomes unstable, causing degradation in operational feeling of the occupant and in cornering performance. In addition, operational control of the actuators becomes complicated, causing an increase in cost of control.

In contrast, in the present invention, because the pair of actuators are arranged in directions intersecting with each other, the link mechanism can be bent and stretched with the same driving force in either direction, thus ensuring a stability of bending and stretching operation (cornering performance), and also leading to a reduction in cost of control.

In embodiments where the vehicle set includes a return device for returning the link mechanism to its neutral position after it has been bent and stretched in either direction, it is unnecessary to hold the link mechanism in its neutral position by continuously driving the link driving device. Consequently, a control and drive for holding the link mechanism in its neutral position became unnecessary, and thus reductions in cost of control and in cost of driving are achieved.

In addition, because the link driving device needs to perform driving only in the case of bending and stretching the link mechanism in either direction, and therefore because the drive for returning the link mechanism to its neutral position can be made unnecessary, a reduction in cost of driving by that much is achieved.

BRIEF DESCRIPTION OF THE DRAWINGS

FIG. 3A is a front view of an R motor, and FIG. 3B is a side view of the R motor.

FIG. 4A is a front view of an upper link and a lower link, and FIG. 4B is a top view of the upper link and the lower link.

FIG. 8A and FIG. 8B show states in which the link mechanism is in a neutral position and it is bent and stretched, respectively.

FIG. 10A is a front view of the vehicle during a left turn, and FIG. 10B is a front view of a hitherto known vehicle during a left turn.

FIG. 11 shows schematic diagrams for explaining a bending and stretching operation of a link mechanism according to a second embodiment, where

DESCRIPTION OF THE REFERENCE NUMERALS

1 Vehicle
11 Occupant portion
11a Seat (part of occupant portion)
12L, 12R Left and right wheels (a pair of wheels)
30, 130, 330 Link mechanism
430-1030 Link mechanism
31, 131, 331 Upper link (first link)
32, 332 Lower link (second link)
40 Connecting link
52L, 152L, 352L L motor (rotational drive unit, part of wheel supporting body, motor unit)
52R, 152R, 352R R motor (rotational drive unit, part of wheel supporting body, motor unit)
52b, 352b Upper shaft-supporting plate (part of wheel supporting body)
52c, 352c Lower shaft-supporting plate (part of wheel supporting body)
53 Actuator device (link driving device)
53F, 453F-1053F F actuator (part of link driving device, actuator)
353C Actuator (part of link driving device)
53B B actuator (part of link driving device, actuator)
60F, 60B Elastic spring device (part of return device)
80Fa-80Fd Supporting shaft
80Ba-80Bd Supporting shaft
θR Camber angle
θL Camber angle

BEST MODES FOR CARRYING OUT THE INVENTION

Figure 1:
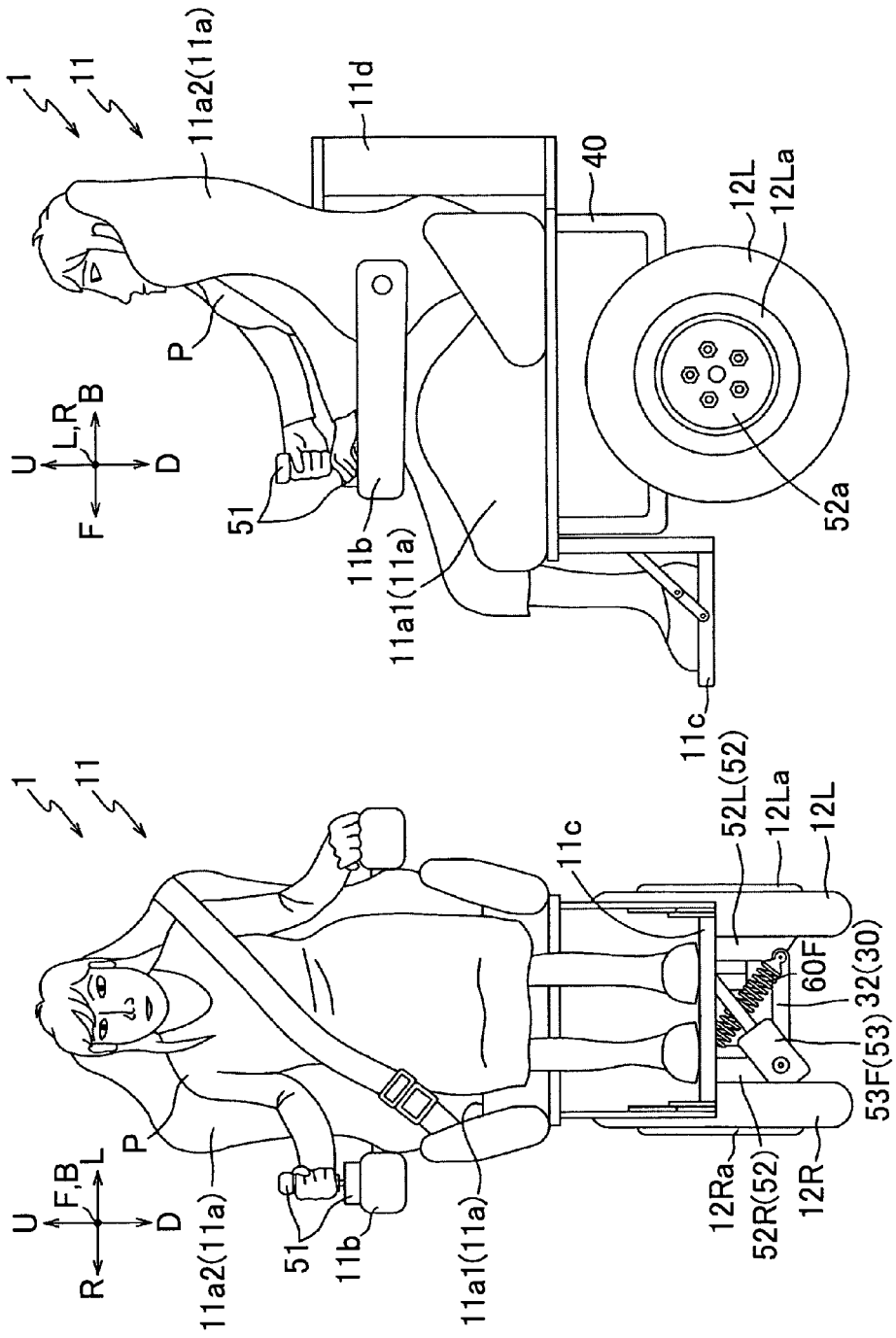
FIG. 1A is a front view of a vehicle according to a first embodiment of the present invention.
FIG. 1B is a side view of the vehicle.

Preferred embodiments of the present invention will be described below with reference to the accompanying drawings. FIG. 1A is a front view of a vehicle 1 according to a first embodiment of the present invention, and FIG. 1B is a side view of the vehicle 1. Note that FIG. 1 shows a state in which an occupant P is sitting on a seat 11a. In addition, arrows U-D, L-R, and F-B in FIG. 1 indicate a vertical direction, a lateral direction, and a longitudinal direction, respectively, of the vehicle 1.

First, an outline structure of the vehicle 1 will be described. As shown in FIG. 1, the vehicle 1 mainly includes an occupant portion 11 in which the occupant P rides, (a pair of) left and right wheels 12L and 12R that are provided below the occupant portion 11 (at the bottom of FIG. 1), and a rotational drive unit 52 that applies rotational driving forces to the left and right wheels 12L and 12R (refer to FIG. 6), and the vehicle 1 is structured such that, by giving camber angles to the left and right wheels 12L and 12R, and also by inclining the occupant portion 11 toward inside of cornering, during cornering (refer to FIG. 10A), an improvement in cornering performance and ensuring of comfort of the occupant P can be attempted.

Next, detailed structures of various portions will be described. As shown in FIG. 1, the occupant portion 11 mainly includes the seat 11a, armrests 11b, and a footrest 11c. The seat 11a is a part on which the occupant P sits during running of the vehicle 1, and is structured so as to include mainly a seating surface portion 11a1 for supporting a hip portion of the occupant P and a back surface portion 11a2 supporting a back portion of the occupant P.

On both the left and the right sides of the seat 11a (on the sides of arrows L and R), there are provided a pair of the armrests 11b for supporting upper arm portions of the occupant P, as shown in FIG. 1. To one of the armrests 11b (on the side of the arrow R), a joystick device 51 is attached. The occupant P directs a running state (for example, a direction of traveling, a running speed, a direction of turning, or a turning radius) of the vehicle 1 by operating the joystick device 51.

On the lower front side of the seat 11a (on the side of the arrow F), the footrest 11e for supporting a foot portion of the occupant P is disposed, as shown in FIG. 1. In addition, on the backside of the seat 11a (on the side of the arrow B), a case lid is disposed, and on the bottom side of the seat 11 (on the side of the arrow D), a battery unit (not shown) and so on are disposed.

Note that the battery unit is a driving source of the rotational drive unit 52 and an actuator device 53 (refer to FIG. 2 for both) as described later. Besides, in the case lid, there are housed a control unit 70 (refer to FIG. 2) described later, and various sensor devices or inverter devices (neither shown), and so on.

The left and the right wheels 12L and 12R are supported by a link mechanism 30 described later, and the link mechanism 30 is connected to the occupant portion 11 through a connecting link 40 described later (refer to FIGS. 6 and 7). The detailed structures will be described later.

Figure 2:
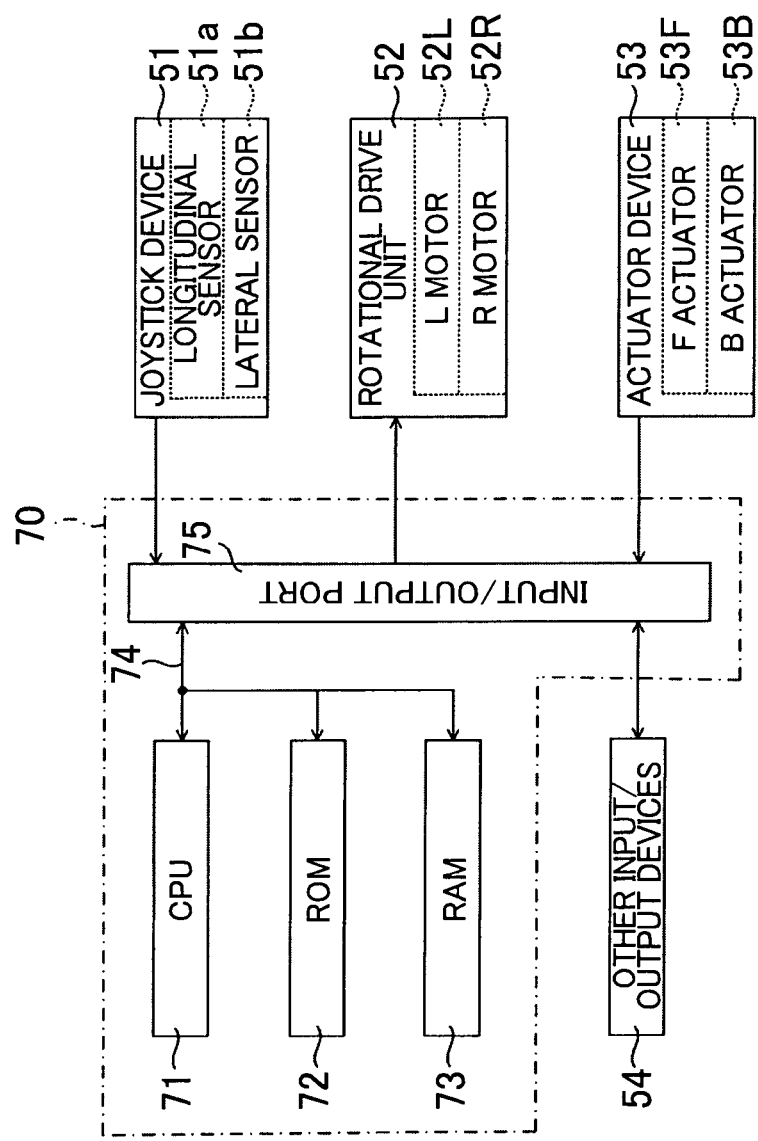
FIG. 2 is a block diagram showing an electrical configuration of the vehicle.

Next, an electrical configuration of the vehicle 1 will be described with reference to FIG. 2. FIG. 2 is a block diagram showing the electrical configuration of the vehicle 1.

The control unit 70 is a control unit for controlling various portions of the vehicle 1, including a CPU 71, a ROM, 72, and a RAM 73, as shown in FIG. 2, that are connected to an input/output port 75 through a bus line 74. In addition, to the input/output port 75, there are connected a plurality of devices, such as the joystick device 51.

The CPU 71 is an arithmetic unit for controlling various portions that are connected by the bus line 74. The ROM 72 is a non-rewritable, non-volatile memory storing control programs executed by the CPU 71 (for example, a flow chart for cornering control processing shown in FIG. 9) and fixed value data, etc., and the RAM 73 is a memory for rewritably storing various work data and flags, etc., during the execution of the control programs.

The joystick device 51 is a device operated by the occupant P when driving the vehicle 1, as described above, and mainly includes a control lever operated by the occupant P (refer to FIG. 1), a longitudinal sensor 51a and a lateral sensor 51b for detecting an operating state of the control lever, and a processing circuit (not shown) that processes detection results of the sensors 51a and 51b, and then sends output to the CPU 71.

The longitudinal sensor 51a is a sensor for detecting an operating state (an amount of operation) of the control lever in the longitudinal direction (in the direction of the arrow F-B, refer to FIG. 1), and based on the detection result of the longitudinal sensor 51a (an amount of longitudinal operation of the control lever), the CPU 71 controls a driving state of the rotational drive unit 52. Hereby, the vehicle 1 is driven at a running speed directed by the occupant P.

The lateral sensor 51b is a sensor for detecting an operating state (an amount of operation) of the control lever in the lateral direction (in the direction of the arrow L-R, refer to FIG. 1), and based on the detection result of the lateral sensor 51b (an amount of lateral operation of the control lever), the CPU 71 controls driving states of the rotational drive unit 52 and the actuator device 53, respectively. Hereby, the vehicle 1 is turned at a turning radius directed by the driver.

In other words, when the control lever is operated in the lateral direction, the CPU 71 judges a direction of turning and a turning radius, based on the detection result of the lateral sensor 51b. The CPU 71 then controls drive of the actuator device 53 so that the left and the right wheels 12L and 12R are inclined toward inside of cornering (refer to FIG. 8), and also controls drive of the rotational drive unit 52 so that a differential motion is produced between the left and the right wheels 12L and 12R, depending on the turning radius. As a result, camber angles are given to the left and the right wheels 12L and 12R, and also the occupant portion 11 is inclined toward inside of cornering, thus achieving an improvement in cornering performance and ensuring of comfort of the occupant P (refer to FIG. 10A).

Note that as described above, in the vehicle 1 of the present invention, by giving camber angles to the left and the right wheels 12L and 12R, a camber thrust is generated to turn the vehicle 1. Consequently, according to the present embodiment, center lines of the left and the right wheels 12L and 12R are held parallel to each other, without being steered right or left. However, a steering mechanism may be provided.

The rotational drive unit 52 is a drive unit for rotationally driving the left and the right wheels 12L and 12R, and is structured so as to include mainly an L motor 52L for applying a rotational driving force to the left wheel 12L, an R motor 52R for applying a rotational driving force to the right wheel 12R, and also a driving circuit and a driving source (neither shown) for controlling each drive of the motors 52L and 52R, based on commands from the CPU 71.

The actuator device 53 is a drive unit for bending and stretching the link mechanism 30 described later, and mainly includes an F actuator 53F disposed on the front side of the link mechanism 30 (on the side of the arrow F, refer to FIG. 7), a B actuator 53B disposed on the back side the link mechanism 30 (on the side of the arrow B, refer to FIG. 7), and also a driving circuit and a driving source (neither shown) for controlling each drive of the actuators 53L and 53R, based on commands from the CPU 71.

In the present embodiment, each of the actuators 53F and 53B is structured as a telescopic electrical actuator, that is, an electrical actuator that can extend and contract using a ball screw mechanism (a mechanism including: a screw shaft having a helical screw groove on its outer circumferential surface; a nut having a helical screw groove corresponding to the helical screw groove of the screw shaft on its inner circumferential surface, and fitting to the screw shaft; a number of rolling elements loaded in a rollable manner between the screw grooves of both the nut and the screw shaft; and an electric motor for rotationally driving the screw shaft or the nut; in which the screw shaft moves relatively to the nut with the screw shaft or the nut rotationally driven by the electric motor).

As other input/output devices 54, there are exemplified a detection device for detecting a running state (running speed, travel distance, etc.) of the vehicle 1, a display device (not shown) for displaying the running state detected by the detection device and informing the occupant P, or an acceleration sensor for detecting an acceleration acting on the vehicle 1.

Next, the L and R motors 52L and 52R will be described with reference to FIG. 3. FIG. 3A is a front view of the R motor 52R, and FIG. 3B is a side view of the R motor 52R. Note that a description about the L motor 52L is omitted, because the L motor 52L and the R motor 52R are structured identically to each other.

As described above, the R motor 52R is a drive unit for applying a rotational driving force to the right wheel 12R, and is structured as an electric motor. In addition, the R motor 52R is structured as what is called an in-wheel motor, and there are disposed a hub 52a on the outer side (on the side of the arrow R) of the vehicle 1, and upper and lower shaft-supporting plates 52b and 52c on the inner side (on the side of the arrow L) of the vehicle 1, as shown in FIG. 3.

The hub 52a is a part to which a disc wheel 12Ra of the right wheel 12R is fixed by fastening by hub nuts or hub bolts (refer to FIGS. 6 and 7), and is formed to a disc shape concentric with a shaft center O of a drive shaft (not shown) of the R motor 52R, as shown in FIG. 3A. When the drive shaft of the R motor 52R is rotationally driven, its rotation is transmitted to the disc wheel 12Ra through the hub 52a, and thus the right wheel 12R is rotationally driven.

The upper shaft-supporting plates 52b and the lower shaft-supporting plates 52c form wheel supporting bodies together with the L and R motors 52L and 52R, and are also members for respectively supporting ends of an upper link 31 and a lower link 32, which are to be described later, via shafts (refer to FIGS. 6 and 7), being fixed by welding on a side face of the R motor 52R (on the side face of the arrow L), as shown in FIG. 3. In addition, in the upper and the lower shaft-supporting plates 52b and 52c, through-holes 52b1 and 52c1 are respectively formed for supporting the upper and the lower links 31 and 32 via shafts.

Note that the upper and the lower shaft-supporting plates 52b and 52c are disposed so that each pair of them respectively face each other at a predefined distance, as shown in FIG. 3B. In the present embodiment, both of these facing distances (dimension in the direction of the arrow F-B) are set to a dimension equal to each other.

In addition, in the present embodiment, a virtual line connecting the through-hole 52b1 of the upper shaft-supporting plate 52b with the through-hole 52c1 of the lower shaft-supporting plate 52c is configured so as to be perpendicular to the shaft center O of the R motor 52R. Hereby, the link mechanism 30 can be structured as a four bar parallelogram link mechanism (refer to FIG. 8), as described later.

Next, the upper link 31 and the lower link 32 are described with reference to FIG. 4. FIG. 4A is a front view of the upper link 31 and the lower link 32, and FIG. 4B is a top view of the upper link 31 and the lower link 32.

The upper link 31 and the lower link 32 are supported at both ends by the R and L motors 52R and 52L via shafts, and are also members for forming a four bar link mechanism together with the R and L motors 52R and 52L (refer to FIGS. 6 to 8), being configured as plate-shaped bodies with the same shape, that is, a roughly rectangular shape in front view, as each other, as shown in FIG. 4.

In addition, through-holes 33R and 33L formed in both ends of the upper and the lower links 31 and 32 are parts where the links are supported by the upper shaft-supporting plates 52b (through-holes 52b1) of the R and L motors 52R and 52L via shafts, and through-holes 33C formed in the longitudinal (lateral in FIG. 4) centers of the upper and the lower links 31 and 32 are parts where the links are supported via shafts by the connecting link 40 described later (refer to FIGS. 6 to 8).

Moreover, in the present embodiment, the link mechanism 30 is structured such that the two upper links 31 and the two lower links 32 are supported at both ends by the R motor 52R and the L motor 52L, respectively, via shafts. The details will be described later refer to FIGS. 6 and 7).

Figure 5A:
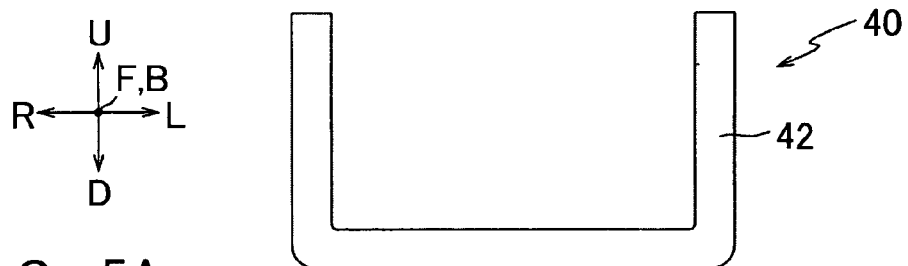
FIG. 5A is a front view of a connecting link.
Figure 5B:
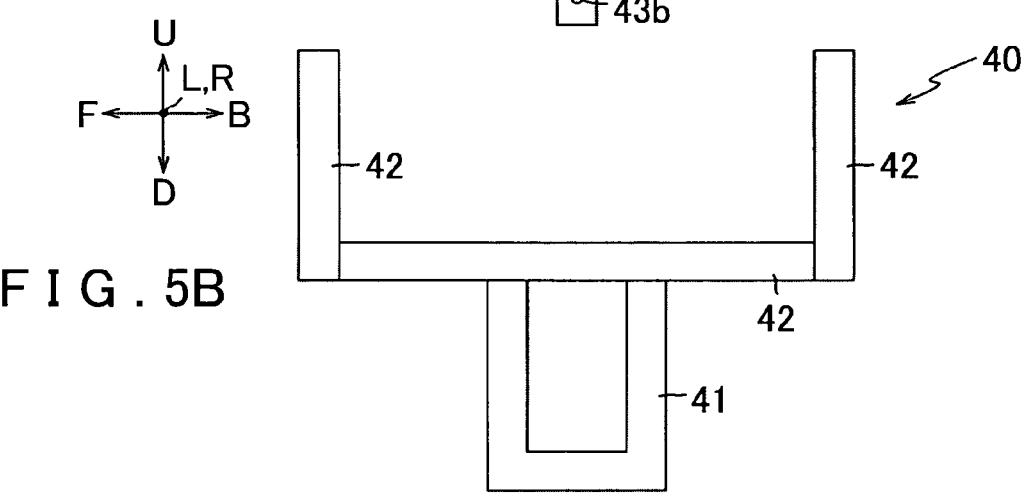
FIG. 5B is a side view of the connecting link.
Figure 5C:
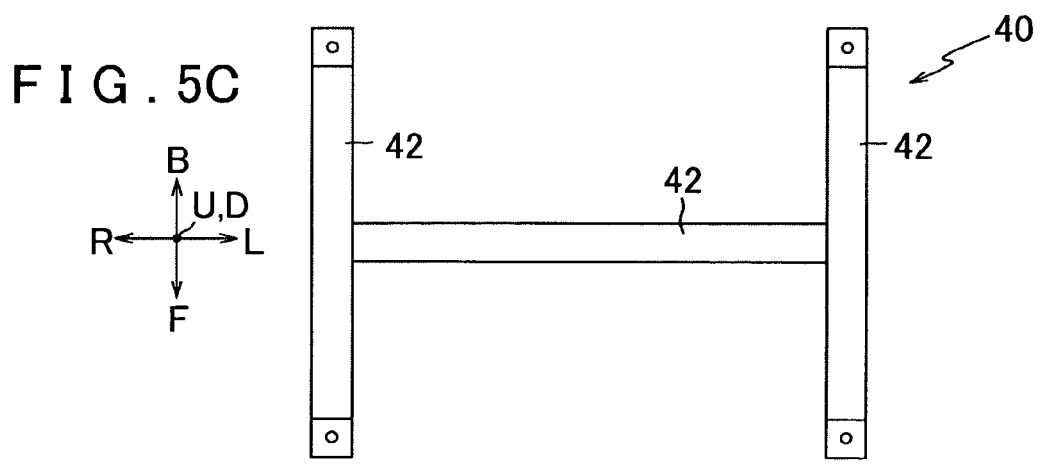
FIG. 5C is a top view of the connecting link.

Next, the connecting link 40 will be described with reference to FIG. 5. FIG. 5A is a front view of the connecting link 40, FIG. 5B is a side view of the connecting link 40, and FIG. 5C is a top view of the connecting link 40.

The connecting link 40 is a member for connecting the link mechanism 30 with the occupant portion 11, and mainly includes a connecting member 41 and an occupant supporting member 42. The connecting member 41 is a part serving as a connecting portion with the upper and the lower links 31 and 32, being formed roughly to a U shape in side view, and connected at upper end to the occupant supporting portion 42 described later, as shown in FIG. 5B.

Figure 6:
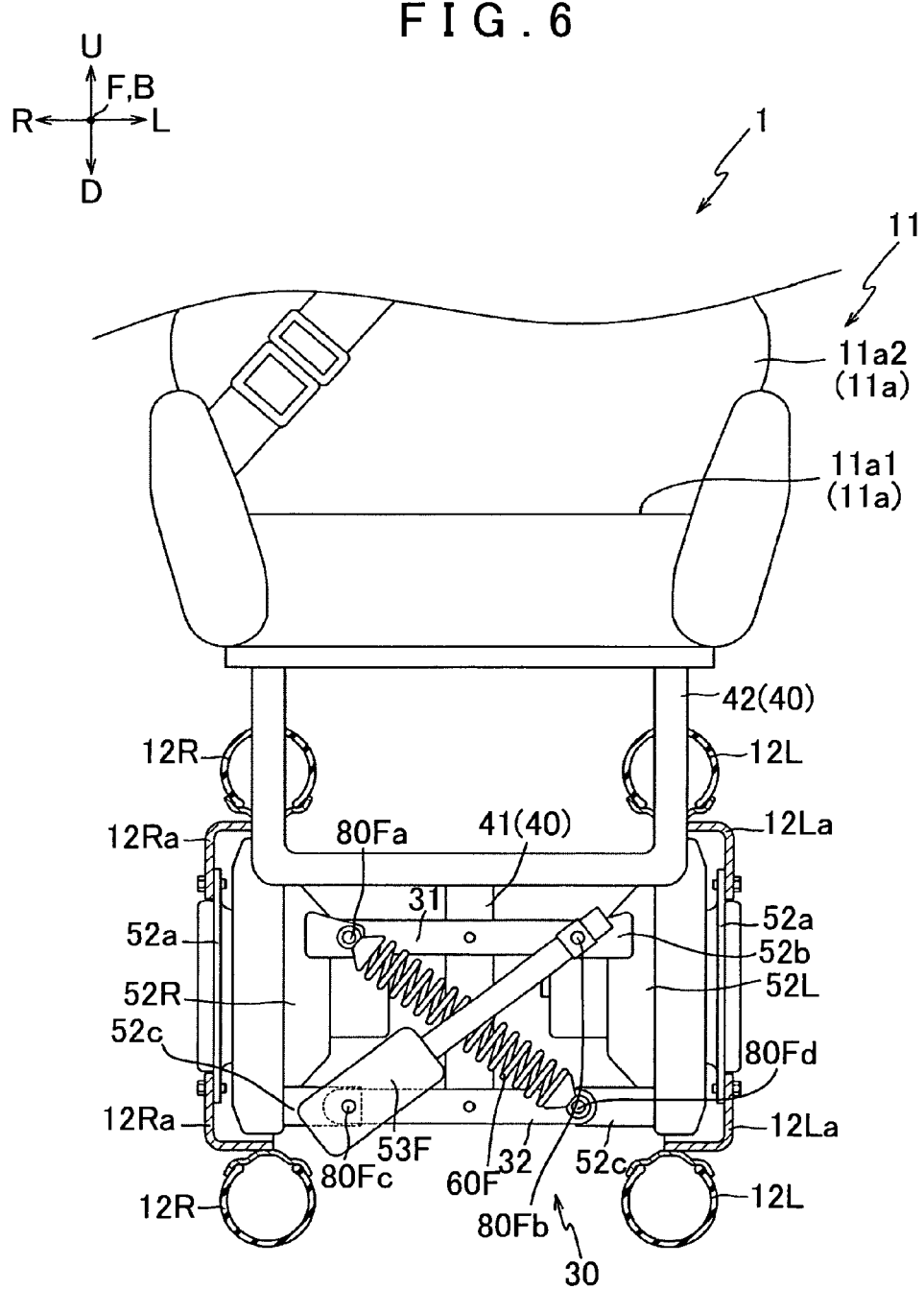
FIG. 6 is a front view of a link mechanism.
Figure 7:
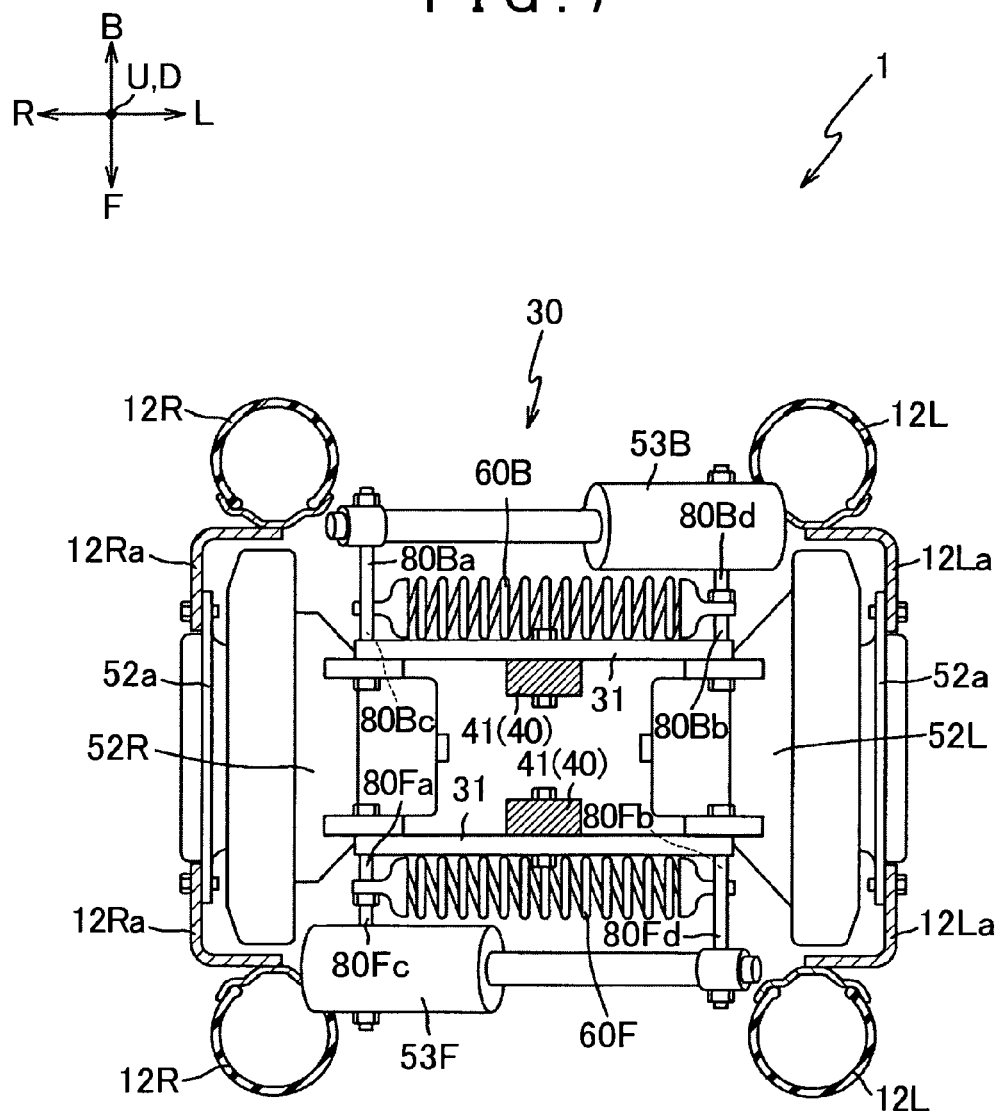
FIG. 7 is a top view of the link mechanism.
Figure 8:
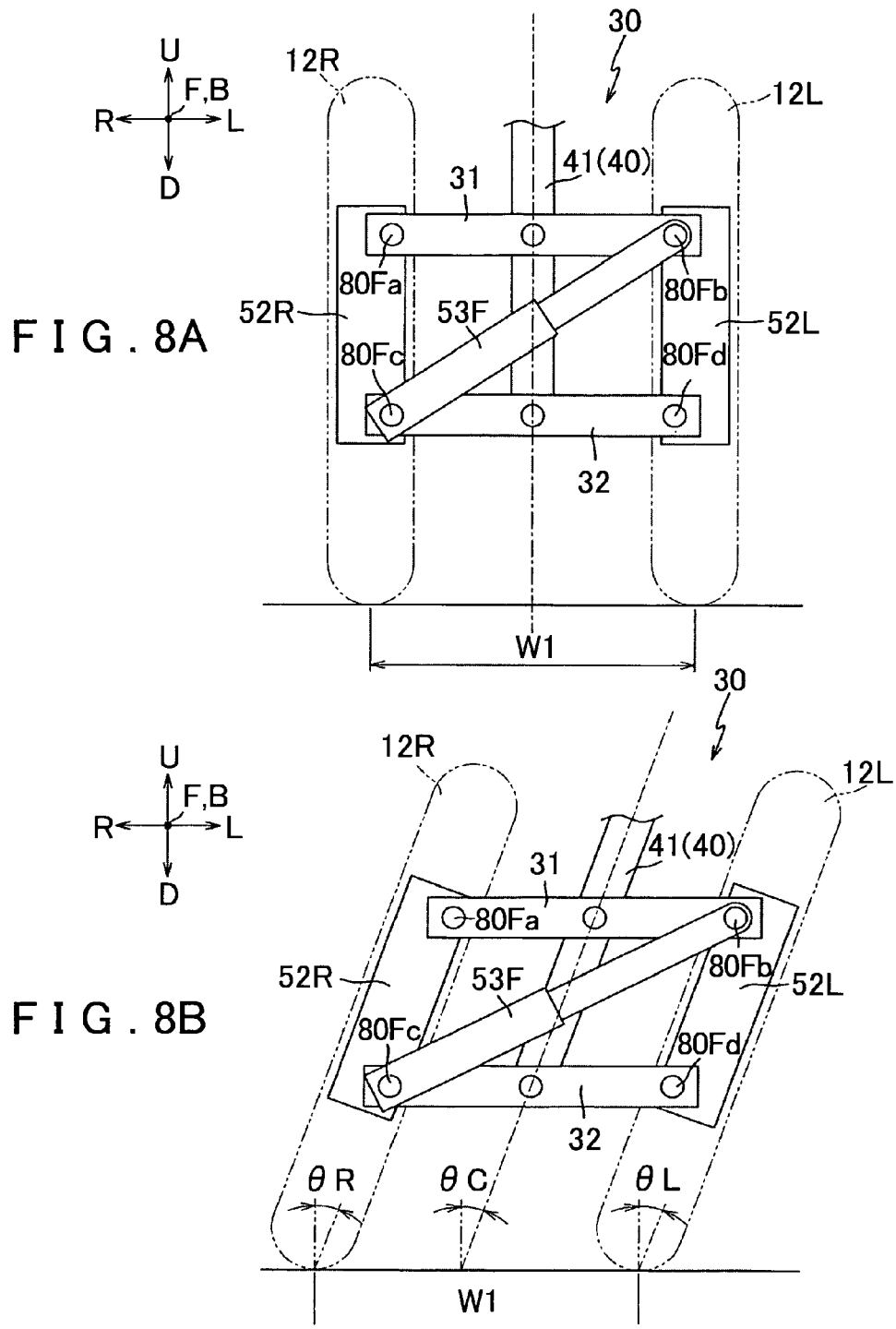
FIG. 8 shows schematic diagrams for explaining a bending and stretching operation of the link mechanism, where

In addition, as shown in FIG. 5A, a through-hole 43a formed in the upper side (on the side of the arrow U) of the connecting member 41 is a part where the member is supported by the through-hole 33C of the upper link 31 via shaft, and a through-hole 43b formed in the lower side (on the side of the arrow D) of the connecting member 41 is a part where the member is supported by the through-hole 33C of the lower link 32 via a shaft (refer to FIGS. 6 to 8).

The occupant supporting portion 42 is a member for supporting the occupant portion 11 (the seat 11a) from the bottom side (on the side of the arrow D, refer to FIG. 6). In this member, a pair of members formed roughly to a U shape in front view as shown in FIG. 5A are integrated by connected by a bar-shaped body, as shown in FIGS. 5B and 5C.

Next, a detailed structure of the link mechanism 30 will be described with reference to FIGS. 6 and 7. FIG. 6 is a front view of the link mechanism 30, and FIG. 7 is a top view of the link mechanism 30. Note that, in FIGS. 6 and 7, in order to simplify the drawings for ease of understanding, the armrests 11b, the footrest 11c, etc. are omitted from the drawings, and also, the left and the right wheels 12L and 12R, as well as the connecting link 40, are viewed as cross sections.

As shown in FIGS. 6 and 7, both ends of the upper link 31 are rotatably supported via shafts by the upper shaft-supporting plates 52b of the R motor 52R and the L motor 52L, and in the same way, both ends of the lower link 32 are rotatably supported via shafts by the lower shaft-supporting plates 52c of the R motor 52R and the L motor 52L, respectively; thus, with the upper and lower links 31, 32 and the R and L motors 52R, 52L, the four bar link mechanism 30 is structured as a parallelogram link mechanism.

Here, in the present embodiment, as shown in FIGS. 6 and 7, because the pair of motor units (that is, the L and R motors 52L and 52R) are structured so as to function as the rotational drive unit for applying rotational driving forces to the left and the right wheels 12L and 12R, a differential motion can be produced between the left and the right wheels 12L and 12R, without providing a complicated structure in which, for example, a differential device is provided and the differential device is connected to the left and the right wheels 12L and 12R by constant-velocity joints.

At the same time, in the present embodiment, because such a pair of the motor units (the L and R motors 52L and 52R) are structured so as to serve both as a rotational drive unit and as the (pair of) right and left wheel supporting bodies, the number of parts can be reduced so as to simplify the structure. As a result, a weight reduction and a reduction in part and assembly cost can be attempted.

In addition, as shown in FIGS. 6 and 7, in the connecting link 40, the connecting member 41 is supported via shafts by the upper link 31 and the lower link 32, and also the occupant supporting member 42 supports the occupant portion 11 (the seat 11a) from the bottom side. Hereby, as described later, the connecting link 40 can be inclined in accordance with bending and stretching of the link mechanism 30, and as a result, the occupant portion 11 can be inclined toward inside of cornering (refer to FIG. 8).

In addition, as shown in FIGS. 6 and 7, the F actuator 53F and the B actuator 53B are disposed on the front side (the side of the arrow F) and the back side (the side of the arrow B), respectively, of the link mechanism 30. The F and B actuators 53F and 53B are drive units for bending and stretching the link mechanism 30, as described above, and are connected at both ends to supporting shafts of the four bar link mechanism 30 that are not adjacent to each other.

In other words, as shown in FIGS. 6 and 7, the F actuator 53F is supported at its lower end (on the main body side) by the lower shaft-supporting plate 52c of the R motor 52R via a supporting shaft 80Fc, while it is supported on its upper end side (on the rod side) by the upper shaft-supporting plate 52b of the L motor 52L via a supporting shaft 80Fb. Hereby, the F actuator 53F is arranged crosswise on a diagonal line of the four bar link mechanism 30.

In addition, as shown in FIG. 7, the B actuator 53B is supported at its lower end (on the main body side) by the lower shaft-supporting plate 52c of the L motor 52L via a supporting shaft 80Bd, while it is supported at its upper end (on the rod side) by the upper shaft-supporting plate 52b of the R motor 52R via a supporting shaft 80Ba. Hereby, the B actuator 53B is arranged crosswise on a diagonal line of the four bar link mechanism 30. Then, the F and B actuators 53F and 53B are arranged in directions intersecting with each other.

In this way, because the F and B actuators 53F and 53B are connected at the both ends to the supporting shafts of the four bar link mechanism 30 that are not adjacent to each other (that is, arranged crosswise to each other on diagonal lines of the four bar link mechanism 30), the distances from the points of application of force (for example, as shown in FIG. 6, the supporting shaft 80Fb and the supporting shaft 80Fc in the case of the F actuator 53F) to the centers of rotation (remaining supporting shafts 80Fa and 80Fd to which both ends of the F actuator 53F are not connected) are maximized, and, by that much, the driving force required for bending and stretching the link mechanism 30 can be reduced.

As a result, because bending and stretching of the link mechanism 30 can be performed smoothly (that is, with high speed and high accuracy), and also because the driving performance required for the actuators (the F and B actuators 53F and 53B) can be held low, the actuators and their driving source can be reduced in size so that a weight reduction and a reduction in part cost can be attempted.

Besides, in the case of providing arms additionally to the link mechanism 30 in order to lengthen the above-mentioned distances from the points of application of force to the centers of rotation, the weight increases by the weight of the arms, and also the arms and the actuators protrude outside of the outer shape of the link mechanism when the link mechanism 30 bends and stretches, thus disabling reduction in size.

In contrast, as in the present embodiment, by employing a structure in which both ends of the actuators (the F and B actuators 53F and 538) are arranged crosswise to each other on the diagonal lines of the link mechanism, the above-mentioned distances can be maximized without providing the arms, and also it is avoided that the actuators protrude outside of the outer shape of the link mechanism when the link mechanism 30 bends and stretches, thus enabling a reduction in size.

In addition, as described above, because the pair of actuators (the F and B actuators 53F and 53B) are arranged in directions intersecting with each other, the link mechanism 30 can be evenly bent and stretched in either direction, compared with in the case of arranging them in the same direction as each other; thus a stability of cornering operation can be ensured.

For example, in a structure in which one actuator is arranged crosswise on a diagonal line of the four bar link mechanism 30, when the actuator is lengthened so as to bend and stretch the link mechanism 30 from its neutral position to one direction (for example, corresponding to a right turn), the angle formed by the direction of application of force and a link of the link mechanism 20 (for example, the angle formed by the F actuator 53F and the L motor 52L, in FIG. 8B) gradually approaches 0°, in accordance with the lengthening.

In other words, the proportion of a force component for rotating a link of the link mechanism 30 (that is, a force component in a perpendicular direction to a virtual line connecting the center of rotation of one link and the point of application of force; for example, in FIG. 8B, if the L motor 52L is assumed as one link, the center of rotation of the one link is a supporting shaft 80Fd, and the point of application of force is a supporting shaft 80Fb; therefore, the virtual line is a line connecting the supporting shaft 80Fd with the supporting shaft 80Fb) in a force applied from the actuator to the link mechanism 30 is reduced.

On the other hand, when the actuator is shortened so as to bend and stretch the link mechanism 30 from its neutral position to the other direction (corresponding to a left turn), the angle formed by the direction of application of force and a link of the link mechanism 30 gradually approaches 90°, in accordance with the shortening.

In other words, the proportion of a force component for rotating a link of the link mechanism 30 (that is, a force component in a perpendicular direction to a virtual line connecting the center of rotation of one link and the point of application of force) in a force acted from the actuator to the link mechanism 30 is increased.

In the case of bending and stretching the link mechanism 30 as described above, the process for lengthening the actuator requires a larger driving force than the process of shortening it requires (in other words, the process for shortening the actuator can bend and stretch the link mechanism 30 with a smaller driving force than the process of lengthening it can).

Therefore, in the case of providing a pair of actuators (the F and B actuators 53F and 53B), because, if the pair of these actuators are arranged in the same direction as each other, the required driving force differ between the process of bending and stretching the link mechanism 30 in one direction (that is, for lengthening the actuator) and the process of bending and stretching it in the other direction (that is, for shortening the actuator), thus, it becomes difficult to make the amount and speed of bending and stretching of the link mechanism 30 accurately coincide between both directions (that is, between right turn and left turn).

As a result, there occurs a problem that bending and stretching of the link mechanism 30, that is, cornering operation of the vehicle 1, becomes unstable, causing degradation in operational feeling of the occupant P and in cornering performance. In addition, operational control of the actuators becomes complicated, causing an increase in cost of control.

In contrast, in the present invention, because the pair of actuators (the F and B actuators 53F and 53B) are arranged in directions intersecting with each other, the link mechanism 30 can be bent and stretched with the same driving force in either direction, thus ensuring a stability of bending and stretching operation (cornering performance), and also leading to a reduction in cost of control of the CPU 71.

In addition, in the present embodiment, as shown in FIGS. 6 and 7, the F and B actuators 53F and 53B are arranged such that their main body sides are located lower than their rod sides. Hereby, because parts of large weight are located on the lower side of the vehicle 1 so as to be able to lower the center of gravity of the vehicle 1, an improvement in cornering performance can be attempted, by that much.

As shown in FIGS. 6 and 7, elastic spring devices 60F and 60B are disposed on the front side (the side of the arrow F) and the backside (the side of the arrow B), respectively, of the link mechanism 30. These elastic spring devices 60F and 60B are drive units for returning the link mechanism 30 to its neutral position by applying urging forces to the link mechanism 30 when the link mechanism 30 is bent and stretched in either direction, and they are structured as coil springs made of metal.

These elastic spring devices 60F and 60B are structured of the same material and into the same shape as each other, and in the same way as in the case of the above-described F and B actuators 53F and 53B, their both ends are connected to the supporting shafts of the four bar link mechanism 30 that are not adjacent to each other.

In other words, as shown in FIGS. 6 and 7, the elastic spring device 60F is supported on its lower end side by the lower shaft-supporting plate 52c of the L motor 52L via the supporting shaft 80Fd, while it is supported on its upper end side by the upper shaft-supporting plate 52b of the R motor 52R via the supporting shaft 80Fa. Hereby, the elastic spring device 60F is arranged crosswise on a diagonal line of the four bar link mechanism 30, intersecting with the F actuator 53F at right angle.

In addition, as shown in FIG. 7, the elastic spring device 6013 is supported at its lower end by the lower shaft-supporting plate 52c of the R motor 52R via a supporting shaft 80Bc, while it is supported at its upper end by the upper shaft-supporting plate 52b of the L motor 52L via a supporting shaft 80Bb. Hereby, the elastic spring device 6013 is arranged crosswise on a diagonal line of the four bar link mechanism 30, intersecting with the B actuator 53B at right angle. Then, the elastic spring devices 60F and 60B are also arranged in directions intersecting with each other.

As described above, in the present embodiment, because the elastic spring devices 60F and 60B are provided so as to return the link mechanism 30 to its neutral position by applying urging forces to it even when the link mechanism 30 is bent and stretched in either direction, it can be made unnecessary to hold the link mechanism 30 in its neutral position by always driving the F and B actuators 53F and 53B. Consequently, a control and drive for holding the link mechanism 30 in its neutral position can be made unnecessary, and thus a reduction in cost of control and in cost of driving can be attempted.

In addition, because the F and B actuators 53F and 5313 need to perform driving only in the case of bending and stretching the link mechanism 30 in either direction, and therefore because the drive for returning the link mechanism 30 to its neutral position can be made unnecessary, a reduction in cost of driving by that much can be attempted. However, the structure may be such that the F and B actuators 53F and 53B are driven also in the process to return to the neutral position. By doing so, it can be attempted to speed up the return process and to stabilize a cornering state.

Moreover, in the present embodiment, as described above, because the elastic spring devices 60F and 60B are arranged in directions intersecting with each other, operations of returning the link mechanism 30 to its neutral position and of holding it can be stably performed in the same way as in the case of the above-described actuators (the F and B actuators 53F and 53B), compared with the case in which they are arranged in the same direction as each other.

Next, operation of the link mechanism 30 thus structured will be described. FIG. 8 shows schematic diagrams for explaining a bending and stretching operation of the link mechanism 30, and corresponds to the front view of the link mechanism 30. Note that, in FIG. 8, the R and L motors 52R and 52L, etc. are schematically illustrated, and the elastic spring member 60F, etc. are omitted from the figure.

As shown in FIG. 8A, when the link mechanism 30 is in its neutral position, the camber angles of the left and the right wheels 12L and 12R are V. The inclination angle of the connecting link 40 is also 0°. Then, when the F actuator 53F is driven to extend, the link mechanism 30 is bent and stretched, giving predefined camber angles θR and θL to the left and the right wheels 12L and 12R, and also giving a predefined inclination angle θC to the connecting link 40, as shown in FIG. 8B.

Note that, in the present embodiment, because the link mechanism 30 is structured as a parallelogram link mechanism, all of the camber angles θR, θL and the inclination angle θC have the same value. Note also that when the F actuator 53F is driven to extend (driven to contract), the B actuator 53B is driven to contract (driven to extend).

Figure 9:
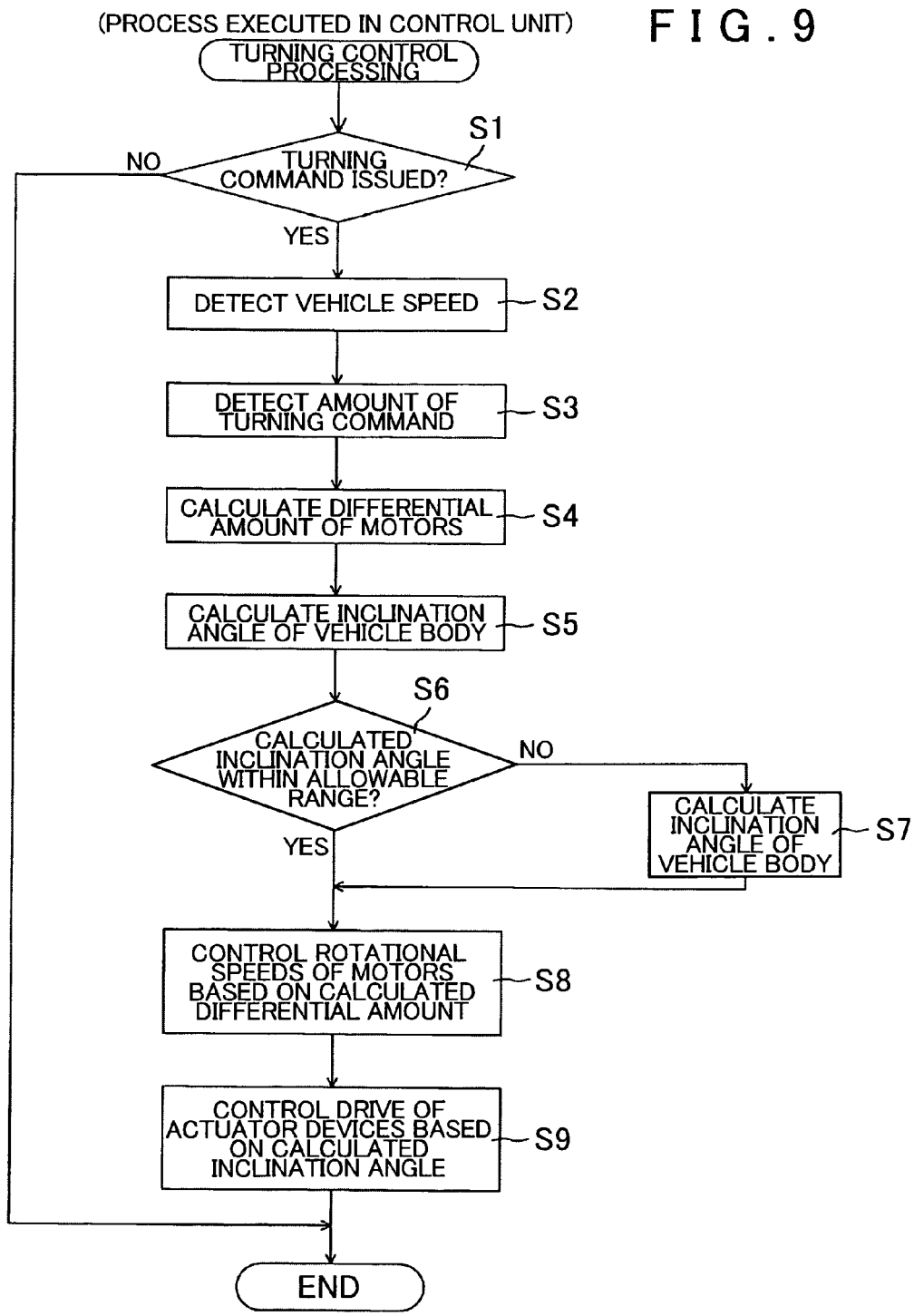
FIG. 9 is a flow chart showing a cornering control processing.

Next, processing executed in the control unit 70 will be described with reference to FIG. 9. FIG. 9 is a flow chart showing a cornering control processing.

Here, in the description of FIG. 9, FIG. 10 will be referred to as appropriate. FIG. 10A is a front view of the vehicle 1, showing a state during a left turn. In addition, FIG. 10B is a front view of a hitherto known vehicle, showing the state during a left turn in the same way as FIG. 10A.

In other words, FIGS. 10A and 10B both show a state in which a vehicle is cornering toward right side on the sheet (that is, a state in which the vehicle is turning left) while running forward to the front side of the sheet. Note that, in order to simplify the drawings for ease of understanding, occupant P is omitted from FIGS. 10A and 10B.

The cornering control processing shown in FIG. 9 is a process that is executed by the CPU 71 iteratively (for example, at intervals of 0.2 ms) while the power of the control unit 70 is on. The process attempts to improve cornering performance and to ensure comfort of the occupant P, during cornering, by giving camber angles toward inside of cornering to the left and the right wheels 12L and 12R, and also by inclining the occupant portion 11 toward inside of cornering to move the center of gravity toward an inner wheel during cornering.

With respect to the cornering control processing, the CPU 71 first judges whether or not a turning command is issued by the occupant P, that is, whether or not the joystick device 51 (control lever) is laterally operated (S1). As a result, if the joystick device 51 is judged not to be laterally operated (S1: No), that means the occupant P has not issued a turning command, then the CPU 71 terminates the cornering control processing.

On the other hand, if the joystick device 51 is judged to be laterally operated (S1: Yes) in process S1, the CPU 71 next detects a current speed and a turning command amount, respectively, of the vehicle 1 (S2 and S3), and then proceeds to processes S4 and later. Note that the turning command amount is detected by the lateral sensor 51b (refer to FIG. 2).

In processes S4 and later, the CPU 71 first calculates a differential amount between the R motor 52R and the L motor 52L, based on the turning command amount detected in the process S3 (S4). In other words, the CPU 71 calculates a differential amount between the R motor 52R and the L motor 52L (inner wheel difference between the left and the right wheels 12L and 12R), so that the vehicle 1 can turn at a turning radius corresponding to the turning command amount.

Next, the CPU 71 calculates a lateral acceleration (centrifugal force) generated when the vehicle 1 is turned at the speed and the turning command amount (turning radius) detected in the processes S2 and S3, and then calculates an inclination angle of the vehicle 1 (that is, the inclination angle θC of the occupant portion 11, or the camber angles θL and θR of the left and the right wheels 12L and 12R, refer to FIG. 8) that balances with the centrifugal force (S5).

After calculating the inclination angle of the vehicle body 1 (S6), the CPU 71 judges whether or not the calculated inclination angle is a value within an allowable range (S6). If the calculated inclination angle is within the allowable range (S6: Yes), the CPU 71 proceeds to process S8; otherwise, if the calculated inclination angle is an inclination angle that leads to overturning of the vehicle body 1, or if it exceeds a limit inclination angle up to which the F and B actuators 53F and 53B can bend and stretch the link mechanism 30 (that is, a structurally operable inclination angle) (S6: No), the CPU 71 recalculates an inclination angle of the vehicle body 1 (S7), and then proceeds to processes S8 and later.

Note that, in the process S7, the CPU 71 adopts, as a recalculated inclination angle of the vehicle body 1, a value that does not lead to overturning of the vehicle body 1 and that is a structurally operable inclination angle which is the closest to the inclination angle calculated in the process S5.

In processes S8 and later, the CPU 71 controls drive (controls rotational speed) of the rotational drive unit 52 (the R and L motors 52R and 52L, refer to FIG. 2) based on the differential amount calculated in the process S4 (S8), and also controls drive (controls amount of extension and contraction) of the actuator device 53 (the F and B actuators 53F and 53B, refer to FIG. 2) based on the inclination angle of the vehicle 1 calculated in the process S5 or S7. Then, the CPU 71 terminates the cornering control processing.

Hereby, because the link mechanism 30 can be bent and stretched (refer to FIG. 8), and thus the left and the right wheels 12L and 12R can be inclined toward inside of cornering as shown in FIG. 9A, a camber thrust by a lateral force is generated, leading to an improvement in cornering force.

Moreover, in this case, in accordance with bending and stretching of the link mechanism 30, the connecting link 40 that is connected to the occupant portion 11 can be inclined in the same direction as that of the left and the right wheels 12L and 12R, at the same time as the left and the right wheels 12L and 12R are inclined (refer to FIG. 8).

Hereby, during cornering, as shown in FIG. 9A, because by inclining the occupant portion 11 toward inside of cornering, the position of the center of gravity of the vehicle 1 can be moved toward the inner wheel during cornering (that is, the position of center of gravity of the vehicle 1 can be moved toward above the inner wheel during cornering (the left wheel 12L in FIG. 9A)), more vehicle weight by that much can act on the inner wheel during cornering, thus increasing a vertical load of the inner wheel during cornering.

As a result, because a counteracting force against the centrifugal force (an arrow A in FIG. 9) can be increased, lifting of the inner wheel during cornering (the left wheel 12L in FIG. 9A) can be prevented, and also the ratio of vertical load between outer and inner wheels during cornering can be equalized to improve cornering performance.

In addition, if the occupant portion 11 can be inclined toward the inner wheel during cornering as described above, such an inclination of the occupant portion 11 can be used to reduce a component of force to laterally slide the occupant P on the seat, and also to increase by that much a component of force in the direction of pressing the hip portion of the occupant P against the seating surface portion 11a1 (seating face) of the seat 11a. In other words, because the lateral acceleration (centrifugal force, the arrow A in FIG. 9) can be made act as a force pressing the hip portion of the occupant P against the seating surface portion 11a1 of the seat 11a, the centrifugal force becomes less likely by that much to be felt by the occupant P.

Hereby, because burden and discomfort of the occupant P due to centrifugal force during cornering can be reduced, and also because the cornering can be performed while keeping the same posture as during straight running, an improvement in comfort and operability for the occupant P can be attempted.

In addition, because the occupant P is not required to counteract the centrifugal force by inclining the occupant's own posture (by shifting the occupant's own body weight) toward the inner wheel during cornering in order to prevent lifting of the inner wheel during cornering, the vehicle 1 can be stably driven without a high-level driving skill, and also driving operation can be performed while keeping the same posture as during straight running. As a result, a reduction in burden of operation and an improvement in comfort of the occupant P can be attempted.

Figure 11A:
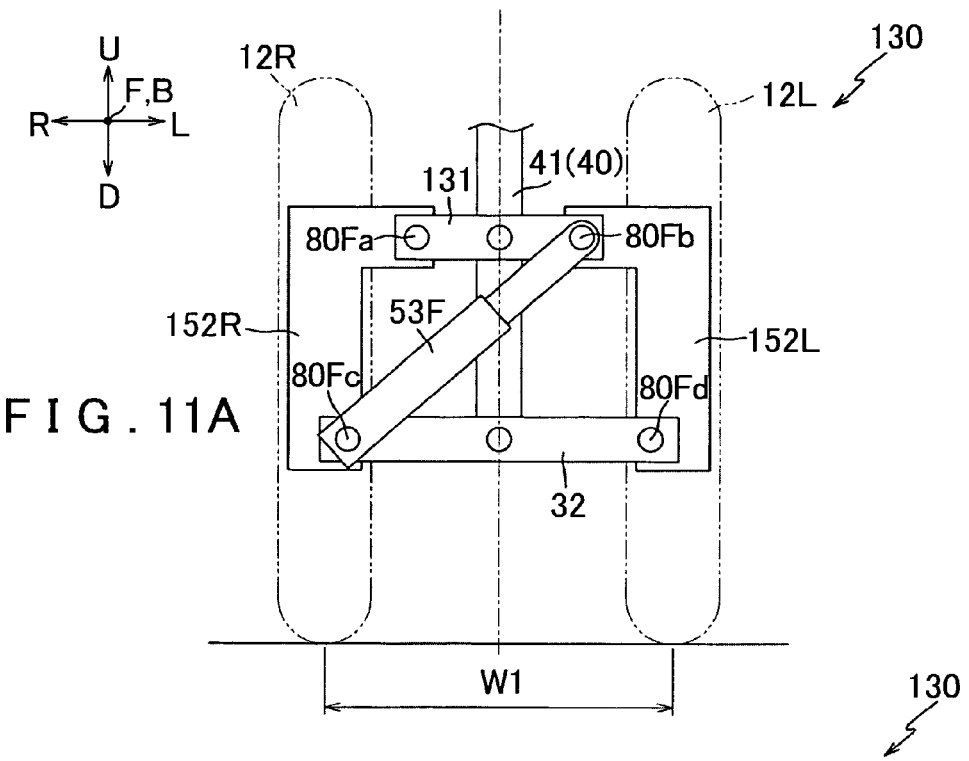
FIG. 11A and FIG. 11B show states in which the link mechanism is in a neutral position and it is bent and stretched, respectively.
Figure 11B:
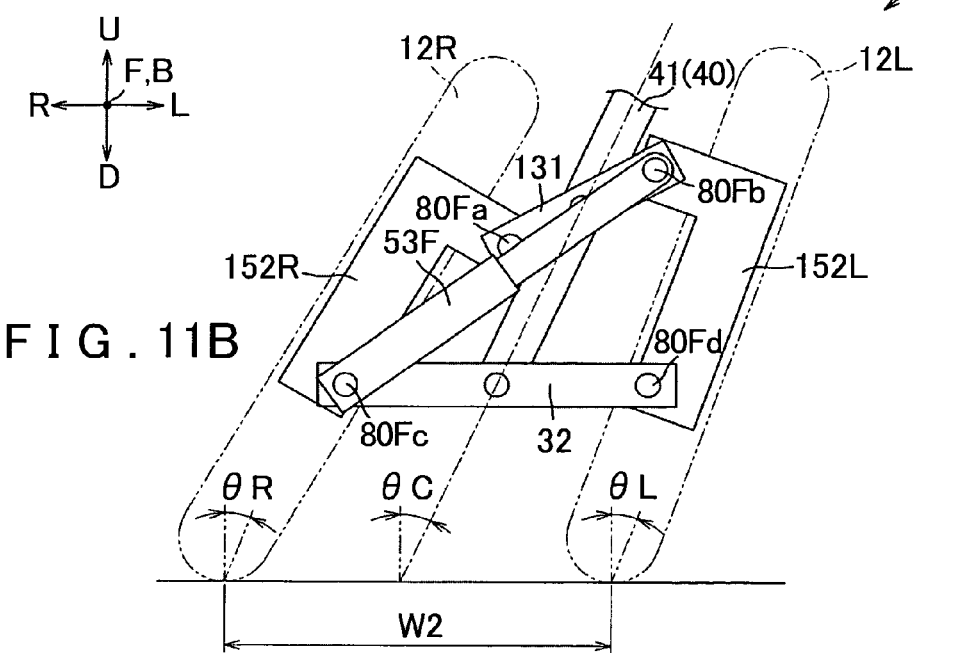

Next, a second embodiment will be described with reference to FIG. 11. FIG. 11 shows schematic diagrams for explaining a bending and stretching operation of a link mechanism 130 according to the second embodiment, and corresponds to a front view of the link mechanism 130. Note that, in FIG. 11, R and L motors 152R and 152L, etc. are schematically illustrated, and the elastic spring member 60F, etc. are omitted from the figure.

In the first embodiment, the case has been described where the center distance between both ends of the upper link 31 has the same distance dimension as the center distance of the lower link 32, but in the second embodiment, a center distance between both ends of an upper link 131 has a smaller distance dimension than the center distance of the lower link 32. Note that the same reference numerals are used for the same parts as those in the above-described first embodiment, and their explanations are omitted.

As shown in FIG. 11, in the link mechanism 130 of the second embodiment, the center distance between the supporting shafts 80Fa and 80Fb via which the R and L motors 152R and 152L support the both ends of the upper link 131 is a distance of smaller dimension than the center distance between the supporting shafts 80Fc and 80Fd via which the R and L motors 152R and 152L support the both ends of the lower link 32.

Hereby, when the link mechanism 130 is bent and stretched by a driving force of the F actuator 53F, etc., the total value of the camber thrust generated on the left and the right wheels 12L and 12R can be increased while keeping the same inclination angle θC of the occupant portion P, compared with the case in which the above-described center distances do not differ from each other (that is, the link mechanism 30 as a parallelogram link mechanism in the first embodiment, refer to FIG. 8).

For example, in the case that the link mechanism 130 of the second embodiment is formed into the same dimensions as those of the link mechanism 30 of the first embodiment (however, as shown in FIG. 11, only the center distance between the supporting shafts 80Fa and 80Fb at both ends of the upper link 131 is shortened), the link mechanisms 30 and 130 are bent and stretched until the inclination angles θC of the occupant portion P become an equal angle (for example, θC=20°) to each other.

In this case, in the link mechanism 30 of the first embodiment, as described above, both of the camber angles θL and θR of the left and the right wheels 12L and 12R have the same value as the inclination angle θC (θC=θL=θR=20°). On the other hand, in the link mechanism 130 of the second embodiment, although the camber angle θL of the left wheel 12L becomes smaller than the inclination angle θC (for example, θL=18°), the camber angle θR of the right wheel 12R becomes greater than the inclination angle θC (for example, θR=23°). As a result, the mean value of the camber angles θL and θR have a greater value than in the case of the first embodiment.

In addition, between camber angle and camber thrust, there is a relation that a camber thrust increases as a camber angle increases. Therefore, according to the link mechanism 130 of the second embodiment, compared with the link mechanism 30 of the first embodiment, the total value of the camber thrust generated on the left and the right wheels 12L and 12R can be increased while keeping the same inclination angle θC of the occupant portion P. Thus, an improvement in cornering force can be attempted.

Moreover, according to the link mechanism 130 of the second embodiment, when the link mechanism 130 is bent and stretched by a driving force of the F actuator 53F, etc., a tread width between the left and the right wheels 12L and 12R can be increased while keeping the same inclination angle θC of the occupant portion P, compared with the case in which the above-described center distances do not differ from each other (that is, the link mechanism 30 as a parallelogram link mechanism in the first embodiment, refer to FIG. 8).

In other words, in the link mechanism 30 of the first embodiment, because it is a parallelogram link mechanism, a tread width W1 between the left and the right wheels 12L and 12R is always constant even when the link mechanism 30 is bent and stretched (refer to FIG. 8), but in the link mechanism 130 of the second embodiment, as shown in FIG. 11, the tread width can be increased as the link mechanism 130 is bent and stretched (W1<W2). Hereby, an improvement in cornering force and cornering stability can be attempted.

Figure 12:
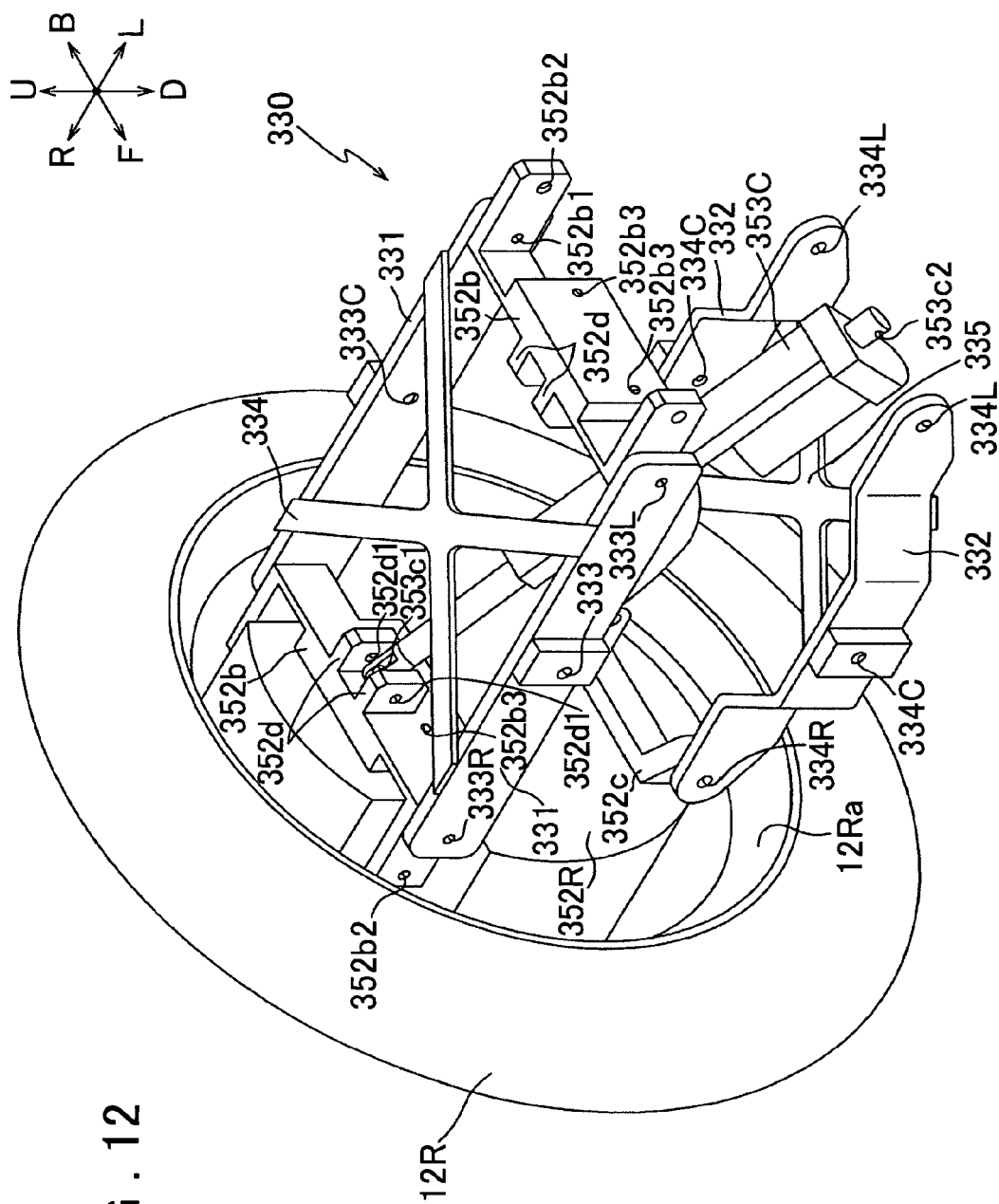
FIG. 12 is a diagrammatic perspective view of a link mechanism according to a third embodiment.

Next, a third embodiment will be described with reference to FIGS. 12 to 14. FIG. 12 is a diagrammatic perspective view of a link mechanism 330 according to the third embodiment. Note that, in order to simplify the drawings for ease of understanding, the left wheel 12L, the L motor, supporting shafts, and so on are omitted from FIG. 12.

In the first embodiment, the case has been described where the F and B actuators 53F and 53B are connected at both ends to the supporting shafts of the link mechanism 30 that are not adjacent to each other, but in the third embodiment, an actuator 353C is connected at both ends to wheel supporting bodies 352b and 352c. Note that the same reference numerals are used for the same parts as those in each of the above-described embodiments, and their explanations are omitted.

As shown in FIG. 12, in the link mechanism 330 of the third embodiment, both ends of an upper link 331 are rotatably supported via shafts by upper shaft-supporting plates 352b of an R motor 352R and an L motor (not shown), and in the same way, both ends of a lower link 332 are rotatably supported via shafts by lower shaft-supporting plates 352c (the other not shown) of the R motor 352R and the L motor (not shown), respectively; thus, with the upper and lower links 331, 332 and the R and L motors 352R (the other not shown), the four bar link mechanism 330 is structured as a parallelogram link mechanism.

Figure 13A:
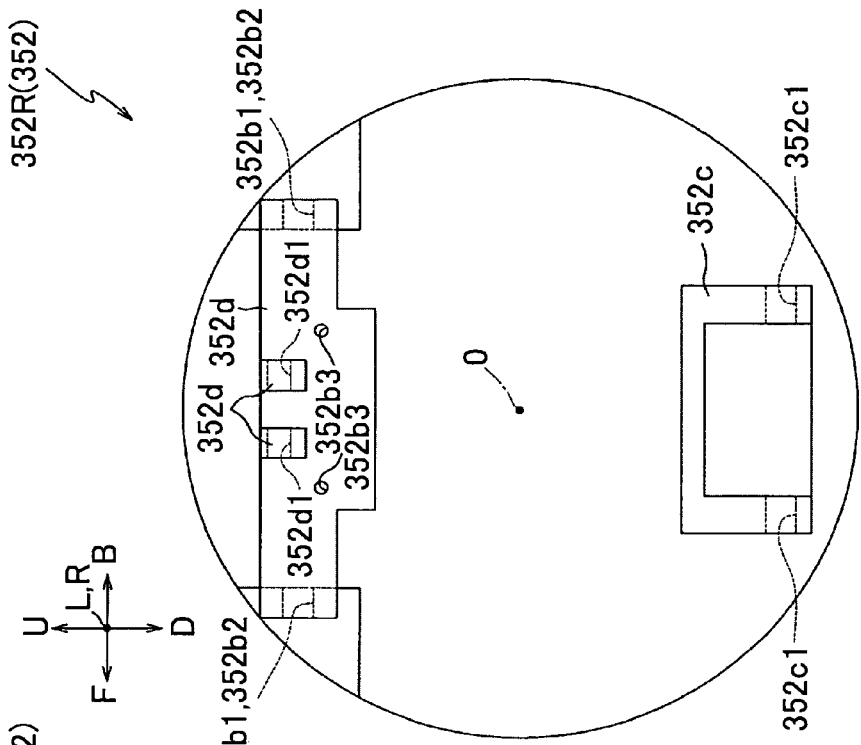
FIG. 13A is a front view of an R motor.
Figure 13B:
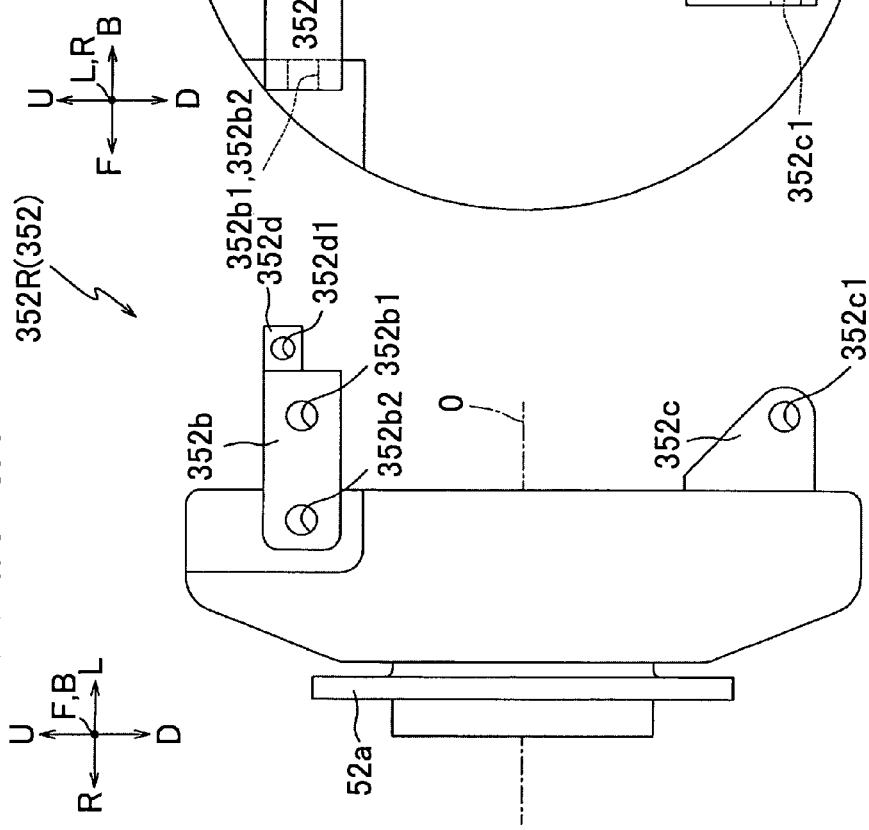
FIG. 13B is a side view of the R motor.

Here, the R motor 352R of the third embodiment will be described with reference to FIG. 13. FIG. 13A is a front view of the R motor 352R, and FIG. 13B is a side view of the R motor 352R. Note that, in the same way as in the case of the first embodiment, in the third embodiment also, a description about the L motor is omitted, because the L motor and the R motor 352R are structured identically to each other.

The R motor 352R is a drive unit for applying a rotational driving force to the right wheel 12R, and is structured as an electric motor. As shown in FIG. 13, on the R motor 352R, the upper shaft-supporting plate 352b and the lower shaft-supporting plate 352c are disposed on the inner side (on the side of the arrow L) of the vehicle 1.

The upper shaft-supporting plate 352b and the lower shaft-supporting plate 352c form the wheel supporting body together with the R motor 352R, and are also members for respectively supporting the ends of the upper link 331 and the lower link 332, which are to be described later, via shafts (refer to FIG. 12), and are fixed on a side face of the R motor 52R (on the side face of the arrow L), as shown in FIG. 13. Note that the upper shaft-supporting plate 352b is fixed by fastening to the R motor 352R via fastening bolts (not shown) inserted through through-holes 352b2 and 352b3. On the other hand, the lower plate 352c is fixed by welding to the R motor 352R.

In the upper shaft-supporting plate 352b, a pair of through-holes 352b1 are formed as shown in FIG. 13, and through these through-holes 352b1, unshown supporting shafts via which the upper link 331 is supported are inserted (refer to FIG. 12). In the same way, in the lower shaft-supporting plate 352c, a pair of through-holes 352c1 are formed, and through these through-holes 352c1, unshown supporting shafts via which the lower link 332 and an end (one or the other of both ends) of the actuator 353C are supported are inserted (refer to FIG. 12).

Note that the upper shaft-supporting plate 352b and the lower shaft-supporting plate and 352c are disposed so that their surfaces in which the through-holes 352b1 and 352c1 are formed (that is, the surfaces on which the upper link 331 and the lower link 332 are supported via shafts) face each other at a predefined distance, as shown in FIG. 13B. In the present embodiment, the facing distance (dimension in the direction of the arrow F-B) in the upper shaft-supporting plate 352b is made wider than the facing distance in the lower shaft-supporting plate 352c.

In addition, in the present embodiment, in the side view shown in FIG. 13A, a virtual line connecting the axial center of the through-holes 352b1 in the upper shaft-supporting plate 352b and the axial center of the through-holes 352c1 in the lower shaft-supporting plate 352c is configured so as to be perpendicular to the shaft center O of the R motor 352R. Hereby, the link mechanism 330 (refer to FIG. 12) can be structured as a four bar parallelogram link mechanism, as described later.

On the upper shaft-supporting plate 352b, a pair of rod mounting brackets 352d are provided to protrude toward the inner side of the vehicle 1 (toward the side of the arrow L), as shown in FIG. 13. These pair of the rod mounting brackets 352d are parts to which an end (one or the other of both ends) of the actuator 353C is connected, and they are arranged so as to face each other at a predefined distance, with a through-hole 352d1 formed in each bracket.

FIG. 12 will be described again. The upper link 331 is a member for forming a part of a four bar link mechanism, as described above, and is configured as a plate-shaped body with a roughly rectangular shape in front view, as shown in FIG. 12. In the present embodiment, in the same way as in the case of the first embodiment, two upper links 331 are arranged parallel to each other. These two upper links 331 are, in addition, fixed connected with each other by a reinforcement girder 334 of an X shape in front view.

At both ends of the upper link 331, through-holes 333R and 333L are formed as shown in FIG. 12, and via unshown supporting shafts inserted through these through-holes 333R, 333L and the through-holes 352b1 of the upper shaft-supporting plate 352b (refer to FIG. 13), the upper link 331 is rotatably supported by the upper shaft-supporting plate 352b.

In addition, in the longitudinal (the direction of the arrow R-L) center of the upper link 331, through-holes 333C are formed as shown in FIG. 12, and via an unshown supporting shaft inserted through these through-holes 333C and through-holes 343a of a connecting link 340 described later (refer to FIG. 14), the connecting link 340 is rotatably supported by the upper link 331.

Figure 14A:
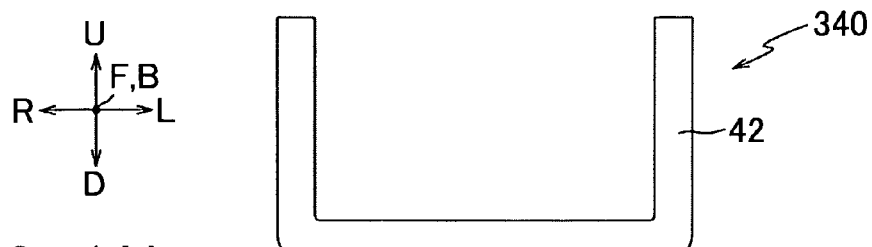
FIG. 14A is a front view of a connecting link.
Figure 14B:
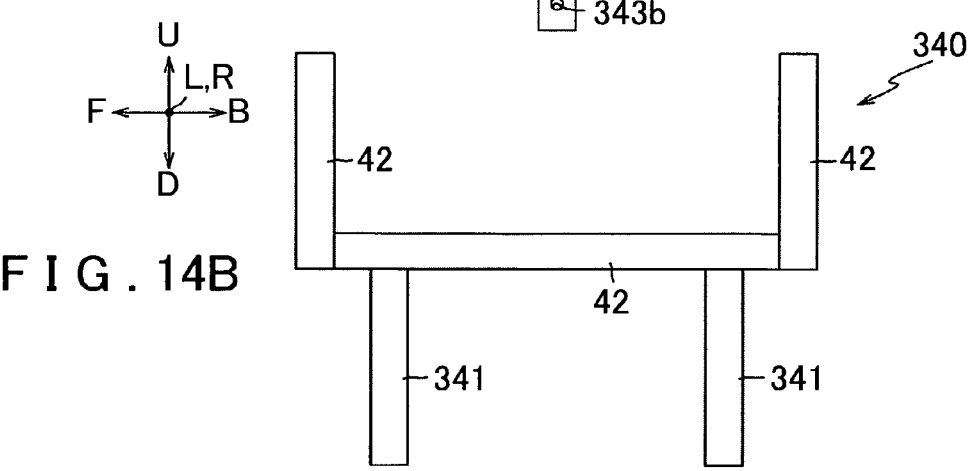
FIG. 14B is a side view of the connecting link.
Figure 14C:
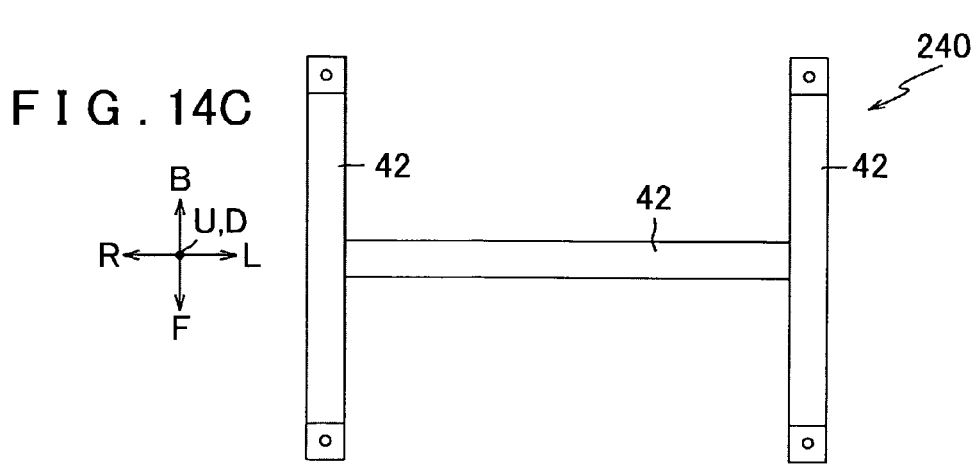
FIG. 14C is a top view of the connecting link.

Here, the connecting link 340 will be described with reference to FIG. 14. FIG. 14A is a front view of the connecting link 340, FIG. 14B is a side view of the connecting link 340, and FIG. 14C is a top view of the connecting link 340. The connecting link 340 is a member for connecting the link mechanism 330 with the occupant portion 11 (refer to FIG. 1), and mainly includes connecting members 341 and the occupant supporting member 42.

The connecting member 341 is a part serving as a connecting portion with the upper and the lower links 331 and 332, being formed to a bar-shaped body with rectangular cross section, and two connecting members being connected to a bottom face of the occupant supporting portion 42 (lower side face of FIG. 14B) at positions apart by a predefined distance, as shown in FIGS. 14A and 14B.

In addition, the through-hole 343a formed in the upper side (on the side of the arrow U) of the connecting member 341 is a part where the member is supported by the through-hole 333C of the upper link 331 via shaft, and a through-hole 343b formed in the lower side (on the side of the arrow D) of the connecting member 341 is a part where the member is supported by a through-hole 334C of the lower link 332 via a shaft (refer to FIG. 12).

FIG. 12 will be described again. The lower link 332 is a member for forming a part of a four bar link mechanism, as described above, and is configured by bending a plate-shaped body with a roughly rectangular shape in front view, as shown in FIG. 12. In the present embodiment, in the same way as in the case of the first embodiment, two lower links 332 are arranged parallel to each other. These two lower links 332 are, in addition, fixed connected with each other by a reinforcement girder 335 of an X shape in front view.

At both ends of the lower link 332, through-holes 334R and 334L are formed as shown in FIG. 12, and via unshown supporting shafts inserted through these through-holes 334R, 334L and the through-holes 352c1 of the lower shaft-supporting plate 352c (refer to FIG. 13), the lower link 332 is rotatably supported by the lower shaft-supporting plate 352c.

In addition, in the longitudinal (the direction of the arrow R-L) center of the lower link 332, the through-holes 334C are formed as shown in FIG. 12, and via an unshown supporting shaft inserted through these through-holes 334C and the through-holes 343b of the above-described connecting link 340 (refer to FIG. 14), the connecting link 340 is rotatably supported by the lower link 332.

The actuator 353C is structured as a telescopic electrical actuator in the same way as in the case of the above-described first embodiment, and as shown in FIG. 12, it is rotatably connected at its end on the rod side (one or the other of both ends) to the upper shaft-supporting plate 352b, and at its end on the main body side (one or the other of both ends) to the unshown lower shaft-supporting plate, respectively.

In addition, at the end on the rod side of the actuator 353C, a through-hole 353c1 is formed, and via an unshown supporting shaft inserted through this through-hole 353c1 and the through-holes 352d1 of rod mounting brackets 353d, the end on the rod side of the actuator 353C is rotatably supported by the upper shaft-supporting plate 352b.

In the same way, at the end on the main body side of the actuator 353C, a through-hole 353c2 is formed, and via an unshown supporting shaft inserted through this through-hole 353c2, the through-holes 334L of the lower link 331, and the through-holes 352c1 of the lower shaft-supporting plate 352c, the end on the main body side of the actuator 353C is rotatably supported by the lower shaft-supporting plate 352c. In addition, between the lower shaft-supporting plate 352c and the end on the main body side of the actuator 353C, two collar members (not shown) are interposed, and thus the end on the main body side of the actuator 353C is positioned.

According to the link mechanism 330 thus structured as a parallelogram link mechanism, when the link mechanism 330 is at its neutral position, the camber angles of the left and the right wheels 12L and 12R are made 0°, and when the actuator 353C is driven to extend, the link mechanism 330 is bent and stretched, giving camber angles θL and θR for right turn to the left and the right wheels 12L and 12R. On the other hand, when the actuator 353C is driven to contract, the link mechanism 330 is bent and stretched, giving camber angles θL and θR for left turn to the left and the right wheels 12L and 12R.

Figure 15A:
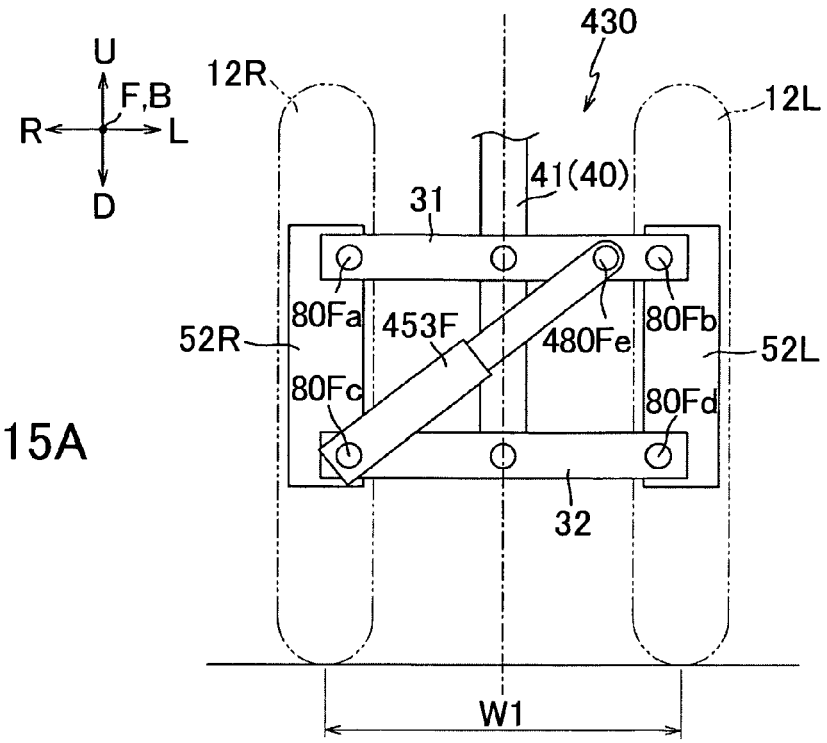
FIG. 15A is a front view of a link mechanism according to a fourth embodiment.
Figure 15B:
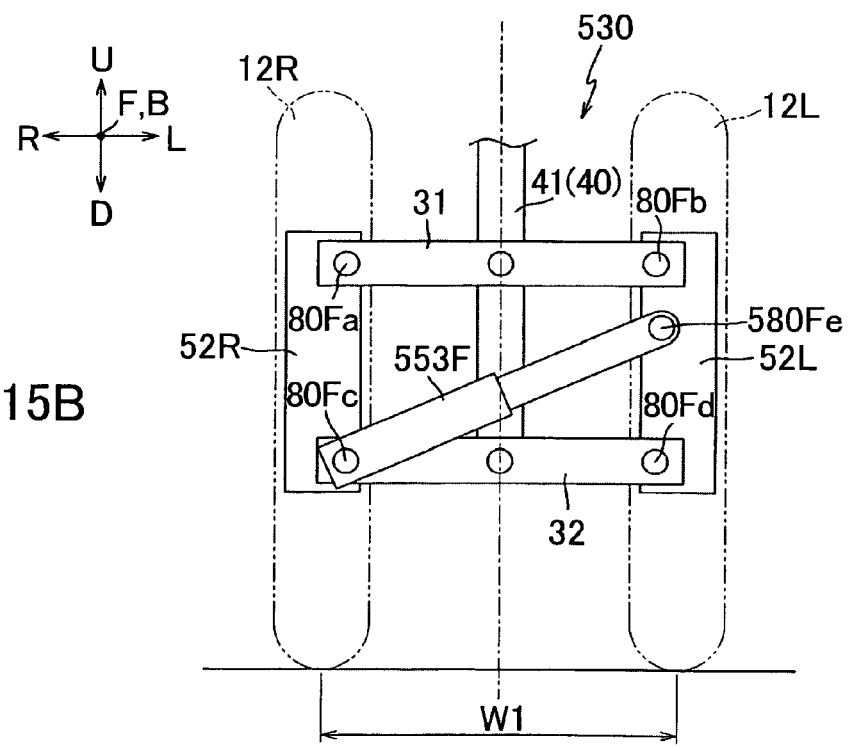
FIG. 15B is a front view of a link mechanism according to a fifth embodiment.

Next, a fourth and a fifth embodiments will be described with reference to FIG. 15. FIG. 15A is a front view of a link mechanism 430 according to the fourth embodiment, and FIG. 15B is a front view of a link mechanism 530 according to the fifth embodiment. Note that, in FIG. 15, R and L motors 52R and 52L, etc. are schematically illustrated, and the elastic spring member 60F, etc. are omitted from the figure.

In the first embodiment, the case has been described where the F and B actuators 53F and 53B are connected at both ends to the supporting shafts (the supporting shafts 80Fb and 80Fc in the case of the F actuator 53F) of the four bar link mechanism 30 that are not adjacent to each other, but in the fourth and the fifth embodiments, only one ends of F and B actuators 453F, 453B, etc. are connected to supporting shafts of the four bar link mechanisms 430 and 530, and the other ends are connected to parts (connecting shafts) that are not the supporting shafts of the four bar link mechanisms 430 and 530 (that is, the shafts serving as centers of turning when the link mechanisms 430 and 530 are bent and stretched). Note that the same reference numerals are used for the same parts as those in each of the above-described embodiments, and their explanations are omitted.

As shown in FIG. 15A, in the link mechanism 430 of the fourth embodiment, an end on the main body side of the F actuator 453F is connected to the supporting shaft 80Fc whereas its end on the rod side is connected to the upper link 31 via a connecting shaft 480Fe. Note that the unshown B actuator 453B is disposed in a direction intersecting with the F actuator 453F, and its end on the main body side is connected to the supporting shaft 80Bd whereas its end on the rod side is connected to the upper link 31 via a connecting shaft.

In addition, as shown in FIG. 15B, in the link mechanism 530 of the fifth embodiment, an end on the main body side of the F actuator 553F is connected to the supporting shaft 80Fc whereas its end on the rod side is connected to the L motor 52L via a connecting shaft 580Fe. Note that the unshown B actuator 553B is disposed in a direction intersecting with the F actuator 553F, and its end on the main body side is connected to the supporting shaft 80Bd whereas its end on the rod side is connected to the L motor 52L via a connecting shaft.

Figure 16A:
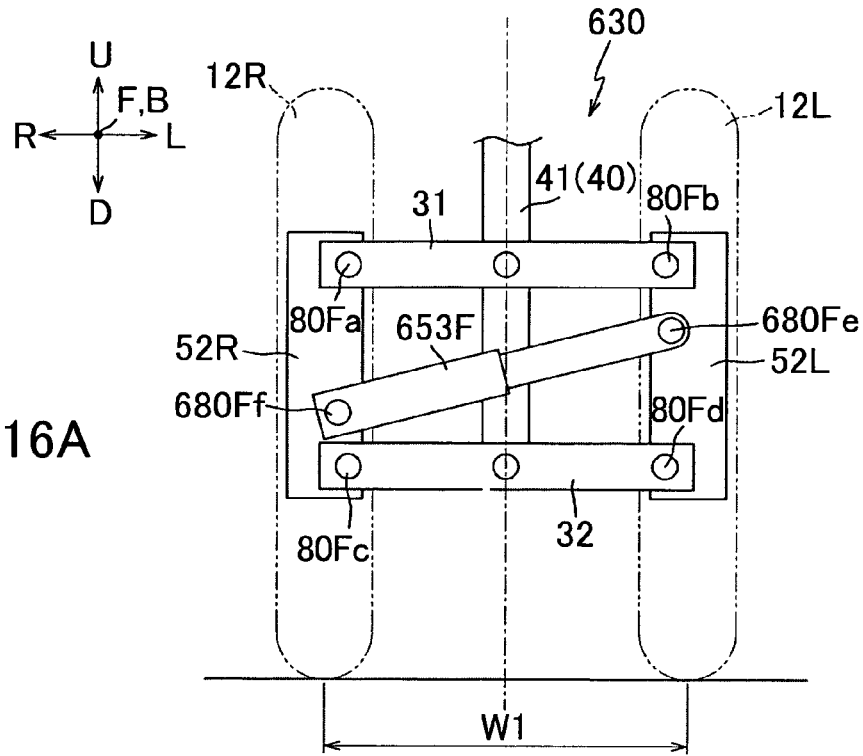
FIG. 16A is a front view of a link mechanism according to the fifth embodiment.
Figure 16B:
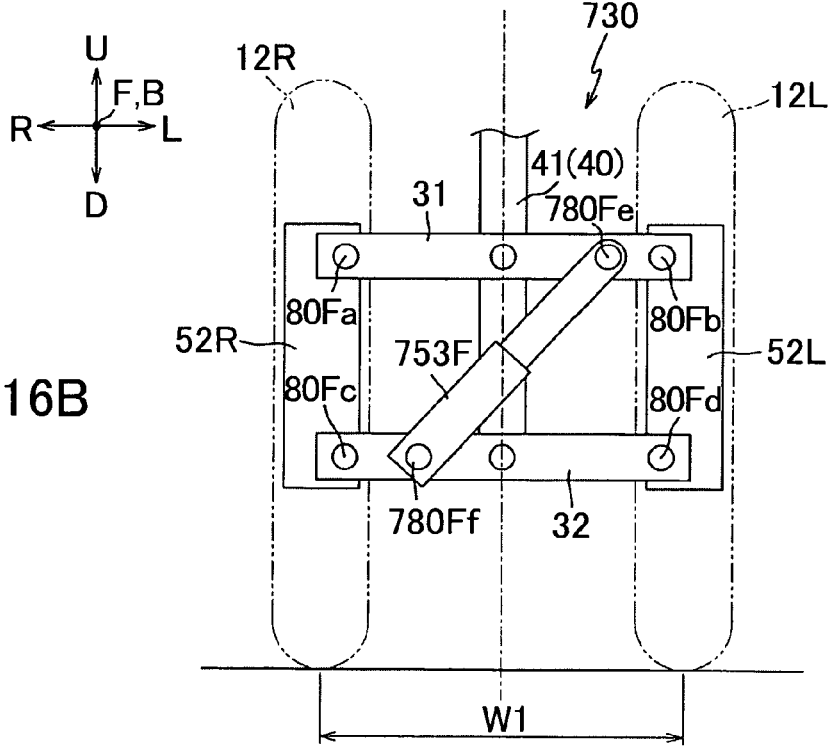
FIG. 16B is a front view of a link mechanism according to a sixth embodiment.
Figure 17A:
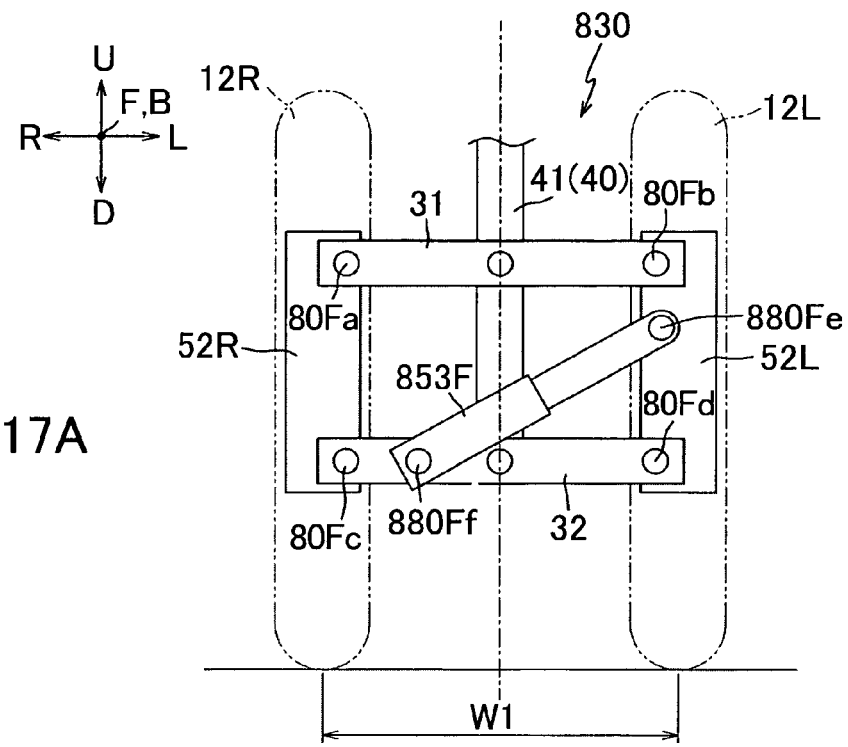
FIG. 17A is a front view of a link mechanism according to a seventh embodiment.

Next, sixth to eighth embodiments will be described with reference to FIGS. 16 and 17A. FIG. 16A is a front view of a link mechanism 630 according to the sixth embodiment, and FIG. 16B is a front view of a link mechanism 730 according to the seventh embodiment. In addition, FIG. 17A is a front view of a link mechanism 830 according to the eighth embodiment. Note that, in FIGS. 16 and 17A, R and L motors 52R and 52L, etc. are schematically illustrated, and the elastic spring member 60F, etc. are omitted from the figure.

In the first embodiment, the case has been described where the F and B actuators 53F and 53B are connected at both ends to the supporting shafts (the supporting shafts 80Fb and 80Fc in the case of the F actuator 53F) of the four-joint link mechanism 30 that are not adjacent to each other, but in the sixth to the eighth embodiments, both ends of F and B actuators 653F, 653B, etc. are connected to parts (connecting shafts) that are not supporting shafts of the link mechanisms 630 to 830 (that is, shafts serving as centers of turning when the link mechanisms 630 and 730 are bent and stretched). Note that the same reference numerals are used for the same parts as those in each of the above-described embodiments, and their explanations are omitted.

As shown in FIG. 16A, in the link mechanism 630 of the sixth embodiment, an end on the rod side of the F actuator 653F is connected to the L motor 52L via a connecting shaft 680Fe whereas its end on the main body side is connected to the R motor 52R via a connecting shaft 680Ff. Note that the connecting shaft 680Ff is arranged in a position closer to the lower link 32 than the connecting shaft 680Fe. Note also that the unshown B actuator 653B is disposed in a direction intersecting with the F actuator 653F, and its end on the rod side is connected to the R motor 52R via a connecting shaft whereas its end on the main body side is connected to the L motor 52L via a connecting shaft.

As shown in FIG. 16B, in the link mechanism 730 of the seventh embodiment, an end on the rod side of an F actuator 753F is connected to the upper link 31 via a connecting shaft 780Fe whereas its end on the main body side is connected to the lower link 32 via a connecting shaft 780Ff. Note that the connecting shaft 780Ff is arranged in a position nearer to the R motor 52R than is the connecting shaft 780Fe. Note also that an unshown B actuator 753B is disposed in a direction intersecting with the F actuator 753F, and its end on the rod side is connected to the upper link 31 via a connecting shaft whereas its end on the main body side is connected to the lower link via a connecting shaft.

In addition, as shown in FIG. 17A, in the link mechanism 830 of the eighth embodiment, an end on the rod side of an F actuator 853F is connected to the L motor 52L via a connecting shaft 880Fe whereas its end on the main body side is connected to the lower link 32 via a connecting shaft 880Ff.

Note that an unshown B actuator 853B is disposed in a direction intersecting with the F actuator 853F, and its end on the rod side is connected to the R motor 52R via a connecting shaft whereas its end on the main body side is connected to the lower link via a connecting shaft.

Figure 17B:
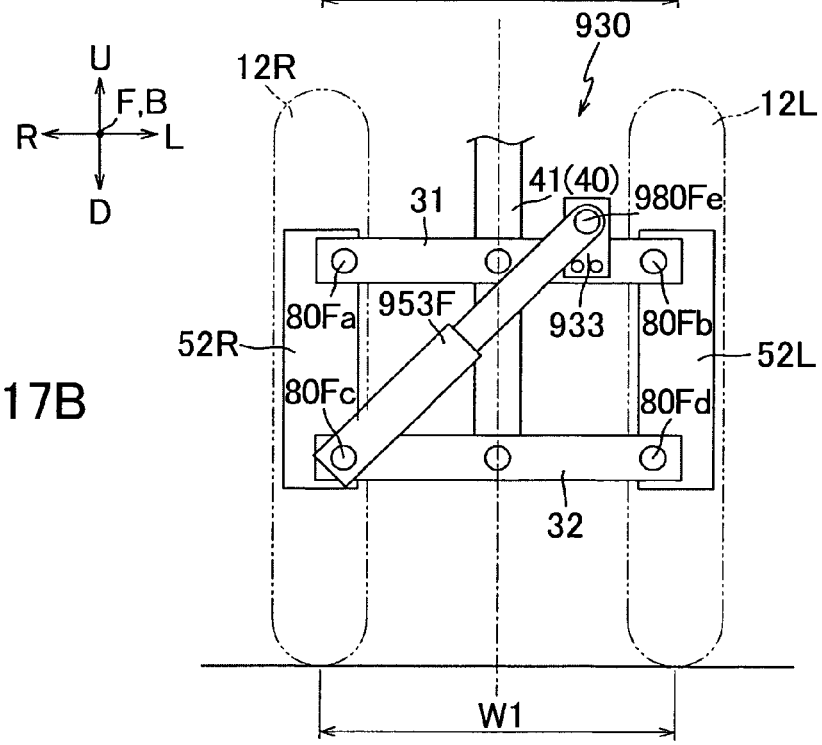
FIG. 17B is a front view of a link mechanism according to an eighth embodiment.
Figure 18:
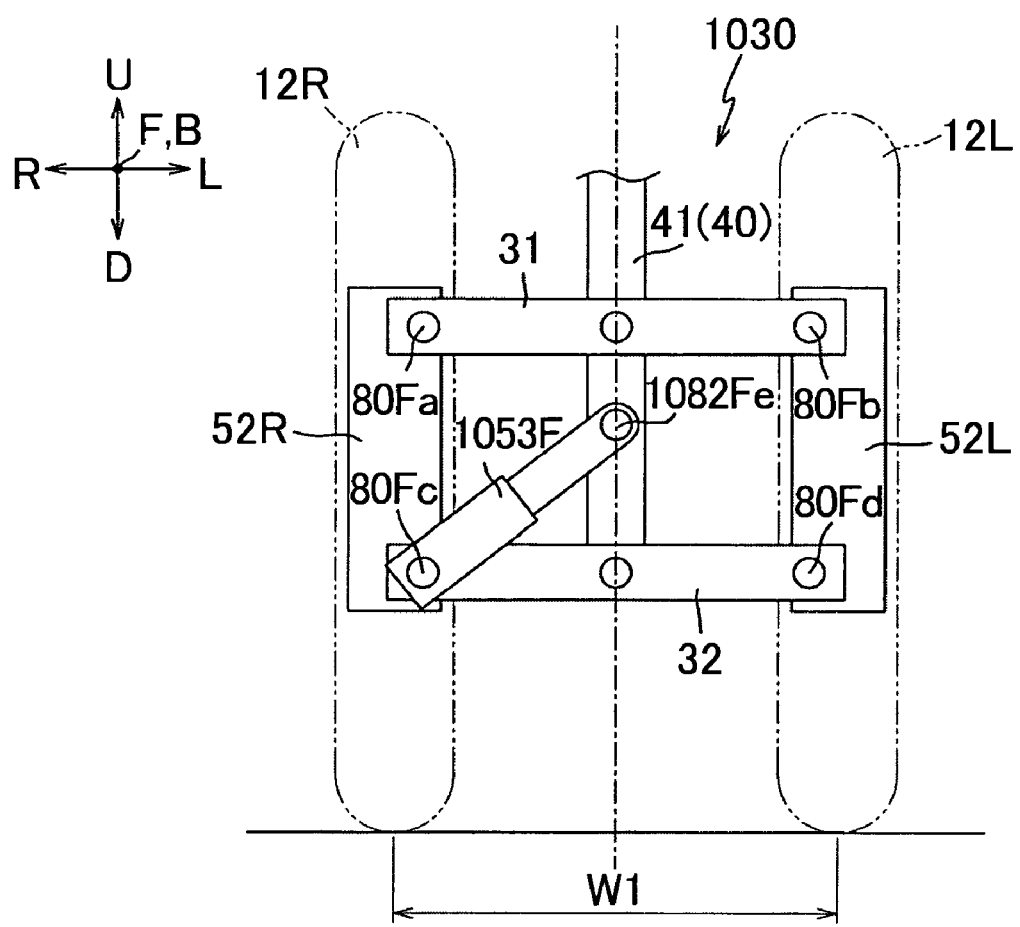
FIG. 18 is a front view of a link mechanism according to a tenth embodiment.

Next, a ninth and a tenth embodiments will be described with reference to FIGS. 17B and 18. FIG. 17B is a front view of a link mechanism 930 according to the ninth embodiment, and FIG. 18 is a front view of a link mechanism 1030 according to the tenth embodiment. Note that, in FIGS. 17B and 18, R and L motors 52R and 52L, etc. are schematically illustrated, and the elastic spring member 60F, etc. are omitted from the figure.

In the first embodiment, the case has been described where the F and B actuators 53F and 53B are connected at both ends to the supporting shafts of the four bar link mechanism 30 that are not adjacent to each other, that is, the case has been described where the both ends are connected on sides of quadrilaterals formed by the link mechanism 30, but in the ninth and the tenth embodiments, at least one of both ends of each of F and B actuators 953F, 953B, etc. is connected to a position that is distant inward or outward from a side of a quadrilateral formed by each of the link mechanisms 930 and 1030. Note that the same reference numerals are used for the same parts as those in each of the above-described embodiments, and their explanations are omitted.

As shown in FIG. 17B, in the link mechanism 930 of the ninth embodiment, an end on the rod side of the F actuator 953F is connected to the upper link 31 via a connecting shaft 980Fe whereas its end on the main body side is connected to the supporting shaft 80Fe. In addition, the connecting shaft 980Fe is arranged in position that is distant from the upper link 31 (that is, a virtual line connecting the supporting shafts 80Fa and 80Fb), being mounted to a mounting plate 933. Note that the unshown B actuator 953B is disposed in a direction intersecting with the F actuator 953F, and its end on the rod side is connected to the upper link 31 via a connecting shaft provided on the mounting plate whereas its end on the main body side is connected to the supporting shaft 80Bc.

In addition, as shown in FIG. 18, in the link mechanism 1030 of the tenth embodiment, an end on the rod side of an F actuator 1053F is connected to the connecting member 41 of the connecting link 40 via a connecting shaft 1080Fe whereas its end on the main body side is connected to the supporting shaft 80Fc. Note that an unshown B actuator 1053E is disposed in a direction intersecting with the F actuator 1053F, and its end on the rod side is connected to the connecting member 41 of the connecting link 40 whereas its end on the main body side is connected to the supporting shaft 80Bd.

Although the present invention has been described based on the above embodiments, the invention is not limited to the above-described embodiments, and it is easily contemplated that various improvements and modifications can be made without departure from the purpose of the invention.

For example, the numerical values described in the above-described embodiments are only for illustration, and therefore, it is apparent that other numerical values can be adopted.

Although in the above-described embodiments, the case has been described where the two motor units (the L and R motors 52L and 52R) are used as a rotational drive unit for rotating the left and the right wheels 12L and 12R, the invention is not necessarily limited to this case, and it may be structured such that one motor unit is connected to the left and the right wheels 12L and 12R through a differential device and constant-velocity joints.

Although in the above-described first, second, and fourth to tenth embodiments, the case has been described where the link mechanisms 30, 130, and 430 to 1030 are returned to their neutral positions with urging forces of the elastic spring devices 60F and 60B, the invention is not necessarily limited to this case, and it may be structured such that the link mechanisms are returned to their neutral positions with driving forces of the F and R actuators 53F and 53B, without using the elastic spring devices 60F and 60B. Hereby, a weight reduction of the whole vehicle 1 can be attempted. On the other hand, the third embodiment may be structured such that the link mechanism 330 is returned to its neutral position with urging forces of the elastic spring devices 60F and 60B, in addition to or without driving force of the actuator 353C.

In addition, although the case has been described where the elastic spring devices 60F and 60B are structured by coil springs made of metal, the invention is not necessarily limited to this case, and the elastic spring devices 60F and 60B can obviously be structured otherwise. As another structure, leaf springs or torsion springs made of metal or plastic, or air springs using compressed air can be exemplified.

Although in the above-described embodiments, the case has been described where, in the cornering control processing, a turning radius of the vehicle 1 is calculated based on an amount of lateral operation of the joystick device 51, the invention is not necessarily limited to this case, and it may be structured such that, for example, a turning radius of a traveling path to be followed by the vehicle 1 is obtained based on information (a current position of the vehicle 1 and map information corresponding to the current position) acquired from a navigation system using GPS.

Although in the above-described embodiments, the case has been described where the F and B actuators 53F, 53B, and the actuator 353C are structured as telescopic actuators by ball screw mechanism, the invention is not necessarily limited to this configuration, and other mechanisms can obviously be used.

As another mechanism, a crank and slider mechanism (a mechanism for obtaining a telescopic actuator by converting a rotational motion of an electric motor to an oscillating motion using a crank mechanism, and then by converting this oscillating motion to a linear motion using a slider mechanism), a rack and pinion mechanism (a mechanism for obtaining a telescopic actuator by transmitting a rotational motion of a pinion driven by an electric motor to a rack, and making the rack perform a linear motion), or a cam mechanism (a mechanism for obtaining a telescopic actuator by making a non-circular cam perform a rotational motion driven by an electric motor, and then by making the rotating cam produce, against a force of an elastic spring device, a sliding contact with a lifter for performing a linear motion) can be exemplified.

Although in the above-described embodiments, the case has been described where the F and B actuators 53F, 53B, etc. and the actuator 353C are structured by electrical actuator, the invention is not necessarily limited to this configuration. The F and B actuators 53F, 5313, and the actuator 353C can obviously be structured, for example, as hydraulic actuators for extending and contracting a hydraulic cylinder using hydraulic pressure.

Although in the above-described third to tenth embodiments, the case has been described where the link mechanisms 330 to 1030 are structured as parallelogram link mechanisms, the invention is not necessarily limited to this case, and it is obviously possible to apply the technical idea described in the second embodiment to the link mechanisms 330 to 1030 in the third to tenth embodiments.

Although in the above-described third embodiment, the case has been described where an end on the rod side of the actuator 353C is connected to the upper shaft-supporting plate 352b of the R motor 352R whereas its end on the main body side is connected to the lower shaft-supporting plate 352c of the L motor 352L (both not shown), the invention is not necessarily limited to this arrangement, and a reverse arrangement is obviously possible.

For example, the end on the rod side of the actuator 353C may be connected to the upper shaft-supporting plate 352b of the L motor 352L whereas its end on the main body side may be connected to the lower shaft-supporting plate 352c of the R motor 352R, or the end on the rod side of the actuator 353C may be connected to the lower shaft-supporting plate 352c of the R motor 352R whereas its end on the main body side may be connected to the upper shaft-supporting plate 352b of the L motor 352L. Note that the same can be applied to other embodiments, in which directions of the F actuator 53F can be any directions.

In addition, in the above-described third embodiment, although the case has been described where both ends of the actuator 353C are respectively connected to the upper shaft-supporting plate 352b and the lower shaft-supporting plate 352c serving as wheel supporting bodies, the invention is not necessarily limited to this arrangement, and the both (or at least one of the both) ends of the actuator 353C can obviously be connected to other places of the wheel supporting bodies. As another place, the R or the L motor 352R or 352L can be exemplified. Note that it is obviously possible to connect at least one end or both ends of the actuator 353C to a place not belonging to the wheel supporting body (for example, the upper or the lower link 331 or 332) via a connecting shaft, a supporting shaft, or other.

Although in the above-described third embodiment, the case has been described where the link driving device is structured so as to include only one actuator 353C, the number of actuators is not necessarily limited to this case, and the link driving device can obviously be structured so as to include two or more actuators. In this case, it is preferable to arrange two actuators in directions intersecting each other, in the same way as in the case of the first embodiment, and so on. On the other hand, although in the above-described first, second, and fourth to tenth embodiments, the case has been described where two actuators (the F and B actuators 53F and 53B, etc.) are included, the number of actuators is not necessarily limited to two, the number can obviously be another (one, or three or more).

Although in the above-described four and five embodiments, the case has been described where an end on the main body side of the F actuator 453F, etc. is connected to the supporting shaft 80Fc, etc., the side to be connected to the supporting shaft 80Fc, etc. is not necessarily limited to an end on the side of the main body side, and an end on the rod side can obviously be connected to the supporting shaft 80Fc, etc.

In addition, in this case, the end on either the main body side or the rod side of the F actuator 453F, etc. may be connected to any part of the supporting shafts 80Fa to 80Fd, etc. Then, the other end of the F actuator 453F, etc., which is connected at one end to one of the supporting shafts 80Fa to 80Fd, etc., must only be connected to any one of the upper link 31, the lower link 32, the R motor 52R, and the L motor 52L, which is not connected to any of the supporting shafts 80Fa to 80Fd, etc. to which the one end is connected.

Although in the above-described eighth embodiment, the case has been described where the F actuator 853F is disposed (connected) between the lower link 32 and the L motor 52L, the invention is not necessarily limited to this case, and the F actuator 853F can obviously be disposed, for example, between the lower link 32 and the R motor 52R, between the upper link 31 and the L motor 52L, or between the upper link 31 and the R motor 52R.

Although in the above-described ninth embodiment, the case has been described where the mounting plate 933 is disposed on the upper link 31, the position of disposition is not necessarily limited to this position, and the mounting plate 933 may be disposed on any one of the lower link 32, the R motor 52R, and the L motor 52L.

In addition, although in the above-described ninth embodiment, the case has been described where the mounting plate 933 is provided to protrude upward (in the direction of the arrow U) from the upper link 31 (the connecting shaft 980Fe is located outside the four sides of the link mechanism 930), the invention is not necessarily limited to this case, and the connecting shaft 980Fe can obviously be located inside the four sides of the link mechanism 930. Note that the same can be applied to the case in which the mounting plate 933 is disposed on any one of the lower link 32, the R motor 52R, and the L motor 52L.

Although in the above-described tenth embodiment, the case has been described where the F actuator 1053F, etc. is connected between the lower link 32 and the connecting link 40, the invention is not necessarily limited to this case, and the F actuator 1053F, etc. can obviously be connected between the lower link 32 and the connecting link 40.

In this case, the connecting position in which the F actuator 1053F, etc. is connected to the connecting link 40 may be located between the upper link 31 and the lower link 32 (that is, between the through-hole 43a and the through-hole 43b, refer to FIG. 5), or may be located above (toward the direction of the arrow U) the upper link 31 (the through-hole 43a).

TRANSLATION OF DRAWINGS

FIG. 2
51 JOYSTICK DEVICE
51A LONGITUDINAL SENSOR
51B LATERAL SENSOR
52 ROTATIONAL DRIVE UNIT
52L L MOTOR
52R R MOTOR
53 ACTUATOR DEVICE
53F F ACTUATOR
53B B ACTUATOR
54 OTHER INPUT/OUTPUT DEVICES
75 INPUT/OUTPUT PORT
FIG. 9
(Process Executed in Control Unit)
Turning Control Processing
S1 TURNING COMMAND ISSUED?
S2 DETECT VEHICLE SPEED
S3 DETECT AMOUNT OF TURNING COMMAND
S4 CALCULATE DIFFERENTIAL AMOUNT OF MOTORS
S5 CALCULATE INCLINATION ANGLE OF VEHICLE BODY
S6 CALCULATED INCLINATION ANGLE WITHIN ALLOWABLE RANGE?
S7 CALCULATE INCLINATION ANGLE OF VEHICLE BODY
S8 CONTROL ROTATIONAL SPEEDS OF MOTORS BASED ON CALCULATED DIFFERENTIAL AMOUNT
S9 CONTROL DRIVE OF ACTUATOR DEVICES BASED ON CALCULATED INCLINATION ANGLE
END

The invention claimed is:

1. A vehicle having a pair of wheels and an occupant portion in which an occupant rides, the vehicle comprising:
    a link mechanism for connecting the pair of wheels; and
    a link driving device for bending and stretching the link mechanism by applying a driving force to the link mechanism,
    wherein the vehicle, with the driving force of the link driving device, pivots the link mechanism to give different camber angles to the pair of wheels to incline the wheels in the same direction such that a tread width of the wheels is increased and also to incline the occupant portion in the same direction as the wheels toward inside of cornering, during cornering,
    wherein the link mechanism comprises a pair of wheel supporting bodies for respectively supporting, via shafts, each of the pair of wheels and comprises also a first link and a second link that are each supported at opposing ends by the pair of wheel supporting bodies via the shafts;
    wherein the link driving device comprises a telescopic actuator, and connects at least one end of the actuator to one of the shafts, the first link, or the second link of the link mechanism, or to the wheel supporting body, and
    wherein a center distance between the supporting shafts via which the pair of wheel supporting bodies respectively support opposing ends of the first link is a distance of smaller dimension than the center distance between the supporting shafts via which the pair of wheel supporting bodies respectively support opposing ends of the second link.

2. The vehicle according to claim 1, wherein the link driving device connects both ends of the actuator to shafts of the link mechanism that are not adjacent to each other.

3. The vehicle according to claim 1, wherein opposing ends of the actuator are respectively connected to the pair of wheel supporting bodies, respectively.

4. The vehicle according to claim 1, further comprising:
    a connecting link that is supported at one end by the first link and the second link via the shafts and that is connected at the other end to the occupant portion, and the vehicle inclining the occupant portion toward inside of cornering by inclining the connecting link in accordance with pivoting of the link mechanism.

5. The vehicle according to claim 1, further comprising:
    a pair of motor units, the pair of motor units serving both as a rotational drive unit for respectively applying rotational driving forces to the pair of wheels and as the pair of wheel supporting bodies for respectively supporting each of the pair of wheels rotatably.

6. The vehicle according to claim 1, wherein the link driving device comprises a pair of telescopic actuators, the pair of actuators either being respectively supported at opposing ends by the-shafts of the link mechanism that are not adjacent to each other or being respectively connected at opposing ends to the pair of wheel supporting bodies, and the pair of actuators also being arranged in directions intersecting with each other, one of the pair of actuators being lengthened while the other actuator being shortened when pivoting the link mechanism.

7. The vehicle according to claim 1, further comprising:
    a return device for returning the link mechanism to a neutral position after it has been bent and stretched in either direction.

8. A vehicle according to claim 1 in the form of a two-wheel vehicle with the two wheels being respectively mounted via the shafts at opposing ends of the first and second links.

9. A vehicle according to claim 8 wherein:
    the first and second links have first ends connected through shafts to a first wheel motor and second ends connected through shafts to a second wheel motor;
    the actuator has one end connected through a shaft to the first end of the first link and an end opposite the one end connected through a shaft to the second end of the second link; and
    the first and second wheel motors rotate about a common axis.

10. A vehicle according to claim 9 wherein the first link becomes inclined relative to horizontal by the pivoting of the link mechanism.

11. A vehicle according to claim 1 wherein:
    the first and second links have first ends connected through shafts to a first wheel motor and second ends connected through shafts to a second wheel motor;
    the actuator has one end connected through a shaft to the first end of the first link and an end opposite the one end connected through a shaft to the second end of the second link; and
    the first and second wheel motors rotate about a common axis.

12. A vehicle according to claim 11 wherein the first link becomes inclined relative to horizontal by the pivoting of the link mechanism.

13. A vehicle according to claim 1 wherein the first link becomes inclined relative to horizontal by the pivoting of the link mechanism.

* * * * *